(12) United States Patent
Miura

(10) Patent No.: US 6,323,889 B1
(45) Date of Patent: Nov. 27, 2001

(54) MULTI-BEAM EXPOSURE APPARATUS HAVING MIRROR TILT ANGLE CONTROL, IMAGE FORMING APPARATUS THAT EMPLOYS THE EXPOSURE APPARATUS, AND IMAGE FORMING METHOD

(75) Inventor: Tatsuyuki Miura, Yokohama (JP)

(73) Assignees: Toshiba Tec Kabushiki Kaisha, Tokyo; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/439,088

(22) Filed: Nov. 12, 1999

(30) Foreign Application Priority Data

Nov. 13, 1998 (JP) .................................................. 10-323872

(51) Int. Cl.[7] ............................ G02B 26/00; G03G 15/04
(52) U.S. Cl. ........................................... 347/234; 359/204
(58) Field of Search .................................. 347/129, 134, 347/234, 235, 233, 242, 257; 359/204; 250/208.6, 578.1, 234, 235

(56) References Cited

U.S. PATENT DOCUMENTS 5,771,061 * 6/1998 Komurasaki et al. ............... 347/242
5,774,248   6/1998 Komatsu ............................... 359/204
5,883,385 * 3/1999 Takahashi et al. ................... 250/235
5,892,533 * 4/1999 Tanimoto et al. .................... 347/257
6,002,506 * 12/1999 Suzuki et al. .................... 359/204 X

FOREIGN PATENT DOCUMENTS 9-314901   12/1997   (JP) .
10-76704    3/1998   (JP) .

* cited by examiner

*Primary Examiner*—Joan Pendegrass
(74) *Attorney, Agent, or Firm*—Foley & Lardner

(57) ABSTRACT

An exposure apparatus emits a number of laser beams to the predetermined positions on a single photosensitive drum. Galvano-mirrors are employed for controlling the distances between the laser beams in the main scanning direction and the sub-scanning direction. The angles of the mirrors of the galvano-mirrors are adjusted in such a manner as to eliminate the adverse effects caused by a drift, such as variations in the viscosity of the dampening agent of a mirror driving mechanism and variations in the magnetic force generated by a magnetic circuit. Without such adverse effects, the laser beams can be guided accurately to the predetermined positions on the photosensitive drum. The angles of the mirrors are monitored by checking whether the laser beams are incident on the predetermined positions on the detection areas of a beam position sensor.

18 Claims, 13 Drawing Sheets

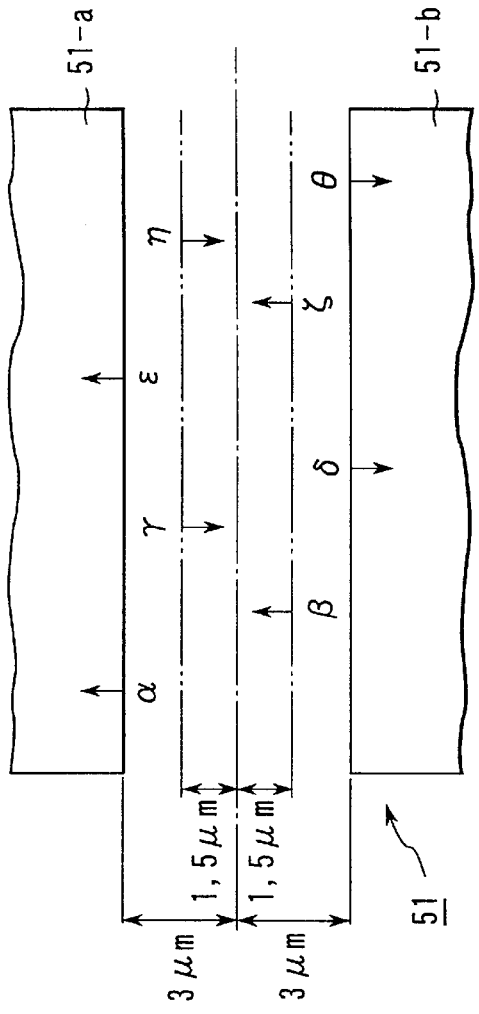

FIG. 11A

| CONFINEMENT DIRECTION | "+" DOWN | | | | "−" UP | | | |
|---|---|---|---|---|---|---|---|---|
| DESIGNATION VALUE | NOT MORE THAN "2000(14BIT)", UPWARD DRIFT | NOT LESS THAN "2000(14BIT)", DOWNWARD DRIFT | NOT LESS THAN "2000(14BIT)", DOWNWARD DRIFT | NOT MORE THAN "2000(14BIT)", DOWNWARD DRIFT | NOT LESS THAN "2000(14BIT)", UPWARD DRIFT | NOT MORE THAN "2000(14BIT)", DOWNWARD DRIFT | NOT LESS THAN "2000(14BIT)", UPWARD DRIFT | NOT LESS THAN "2000(14BIT)", DOWNWARD DRIFT |
| CONFINEMENT RESULT | UPWARD PATTERN (+) | UPWARD PATTERN (+) | DOWNWARD PATTERN (−) | DOWNWARD PATTERN (−) | UPWARD PATTERN (+) | DOWNWARD PATTERN (−) | UPWARD PATTERN (+) | DOWNWARD PATTERN (−) |
| DRIFT CONTROL | CONFINE -MENT | CONFINE -MENT | CONFINE -MENT | CONFINE -MENT | CONFINE -MENT | CONFINE -MENT | CONFINE -MENT | CONFINE -MENT |
| (PATTERN) | α | β | γ | δ | ε | ζ | η | θ |

FIG. 11B

MULTI-BEAM EXPOSURE APPARATUS HAVING MIRROR TILT ANGLE CONTROL, IMAGE FORMING APPARATUS THAT EMPLOYS THE EXPOSURE APPARATUS, AND IMAGE FORMING METHOD

BACKGROUND OF THE INVENTION

The present invention relates to a multi-beam exposure apparatus which emits two or more light beams for exposure and which is applicable to a high-speed digital copying machine, a high-speed printer apparatus or the like. The present invention also relates to an image forming apparatus that employs that exposure apparatus.

An image forming apparatus that utilizes an electrostatic photography process includes an image reading section and an image forming section. The image reading section photoelectrically converts optical image information to an electric image signal and outputs this electric image signal. The optical image information represents a light intensity pattern of an object to be read (e.g., a sheet-like document or a book) and is specifically light reflected from the object. The image forming section forms an image corresponding to the image signal obtained by the image reading section. The image forming section forms an image on the basis of not only an image signal supplied from the image reading section but also an image signal externally supplied.

In this type of image forming apparatus, the image forming speed is increased by radiating a plurality of laser beams to a photosensitive body at one time. The laser beams are adjusted such that they have a diameter corresponding to the resolution required of an output image.

There are two method in which a plurality of laser beams are radiated onto the laser beams at one time. One of the methods is to employ a number of exposure apparatuses each radiating a single laser beam. The other method employs a multi-beam exposure apparatus made up of one or two exposure apparatuses. The multi-beam exposure apparatus includes two or more semiconductor laser elements, optical members for adjusting the diameter of the laser beams from the semiconductor laser elements and the positions to which the laser beams are radiated at one time. The former method, which employs a number of exposure apparatuses, is disadvantageous in that the copying apparatus (or printer apparatus) requires a wide installation space for the exposure apparatuses. In addition, the former method inevitably increases the manufacturing cost. This being so, multi-beam exposure apparatuses are in wide use these days.

As described above, the multi-beam exposure apparatus includes two or more semiconductor laser elements each radiating a laser beam, and optical members for adjusting the diameter of the laser beams emitted from the semiconductor laser elements in accordance with the required resolution and for adjusting controlling the distances between the adjacent laser beams in the axial direction of the photosensitive drum and in the direction perpendicular thereto. In addition to these structural elements, the multi-beam exposure apparatus includes a deflecting device for deflecting the laser beams in the axial direction at one time (i.e., scanning the laser beams across the photosensitive body), and a focusing lens for focusing the laser beams deflected by the deflecting device in the axial direction of the photosensitive drum in such a manner that the deflection angle at which the laser beams are deflected by the deflecting device changes in proportion to the distance for which the laser beams travel before reaching the photosensitive body. A method for adjusting the distances between the adjacent laser beams to be predetermined values is disclosed in Jpn. Pat. Appln. KOKAI Publication No. 10-76704 (i.e., Japanese Patent Application No. 8-233198), for example. According to the publication, a galvano-mirror, which has a mirror surface rotatable in an arbitrary direction, is employed for adjusting the distance between the two adjacent beams. The galvano-mirror is, for example, a mirror device whose mirror surface is driven finely by an electromagnetic coil or the like.

According to Jpn. Pat. Appln. KOKAI Publication No. 10-76704, a dampening agent, such as silicone gel, is used for preventing the mirror from vibrating due to external vibration. A mirror driving force is produced by the interaction between a magnetic force which is provided by a magnetic circuit and a driving force which is applied from an electromagnetic coil to a mirror support member to tilt the mirror at a predetermined angle. This driving force is adversely affected if the viscosity of the dampening agent is lowered by a temperature increase caused by the heat generated by the coil or if the magnetic force provided by the magnetic circuit varies due to the temperature increase. As a result, the relationships between the current flowing through the coil and the angle of rotation of the mirror change with time. Due to this drift phenomenon, the mirror cannot be driven to a desired angle at all times.

Due to the view of the problems discussed above, successive image forming operation may not be performed reliably. To be more specific, the image formed immediately after the power switch is turned on and the image formed immediately before the image forming operation comes to an end may differ in size. In addition, an image formed under special conditions may be distorted. Although image formation for one sheet is completed within several seconds, the condition under which an image is formed may vary in this short period. In other words, an image is not formed under the same condition between the front and rear end portions, and the lines constituting an image may vary in the sheet conveyance direction and in the direction perpendicular thereto.

BRIEF SUMMARY OF THE INVENTION

Accordingly, an object of the present invention is to provide a multi-beam exposure apparatus which emits a plurality of laser beams to expose an image to the laser beams, and which accurately controls the tilting angle of the mirror, thereby accurately controlling the distance between scanning lines in both the main scanning direction and the sub-scanning direction.

The present invention provides an exposure apparatus comprising; a plurality of light sources for emitting light beams, respectively, and light path alignment mirrors for synthesizing the light beams from the light sources together, such that the light beams are away from one another by predetermined distances in both a first direction and a second direction perpendicular to the first direction. A deflection device is provided for deflecting the light beams, emitted from the light sources and synthesized by the light path alignment mirror, in the first direction. A shift detection sensor is provided for sensing at least one of the light beams emitted from the light sources and deflected by the deflection device, and for detecting how light path alignment mirror is shifted in the first and second directions. Light path alignment mirror-driving units are provided for correcting a shift of each of the light path alignment mirrors in accordance with a shift detected by the shift detection sensor such that the light beams emitted from the light sources can be regarded as one light beam.

The present invention also provides an exposure apparatus comprising; a plurality of light sources for emitting light beams, respectively, and light path alignment mirrors for synthesizing the light beams from the light sources together, such that the light beams are away from one another by predetermined distances in both a first direction and a second direction perpendicular to the first direction. A deflection device is provided for deflecting the each of light beams, emitted from the light sources and synthesized by the light path alignment mirror, in the first direction. A shift detection sensor is provided for sensing at least one of the light beams emitted from the light sources and deflected by the deflection device, and for detecting how each of the light path alignment mirrors is shifted in the first and second directions. Light path alignment mirror-driving units are provided for correcting a shift of each of the light path alignment mirrors in accordance with a shift detected by the shift detection sensor such that the light beams emitted from the light sources can be regarded as one light beam. Each of the optical path alignment mirror-driving units drive the optical path alignment mirrors to correct a shift in at least one of the first and second directions in a period of time in which the deflection device warms up and becomes ready for a predetermined operation.

The present invention further provides a mirror adjusting method for use in an exposure apparatus comprising a plurality of movable mirrors which are equal in number to light sources and which are electro-magnetically driven so that reflection surfaces thereof are tilted at such angles as to enable light beams from the light sources to be spaced by predetermined distances in a first direction and in a second direction perpendicular to the first direction, a deflection device for deflecting the light beams, emitted from the light sources and synthesized by the movable mirrors, in the first direction, a shift sensor, having at least two detection areas spaced by a predetermined distance in the second direction, for sensing the light beams emitted from the light sources and deflected by the deflection device, and for detecting how the movable mirrors are shifted in the first and second directions, and a plurality of movable mirror drivers for correcting shifts of the movable mirrors in accordance with shifts detected by the shift detection sensor, such that the light beams emitted from the light sources can be regarded as one light beam. The method is for adjusting the angles of the movable mirrors in both the first and second directions in accordance with the light beams emitted from the light sources and being incident on the shift sensor. The method comprises supplying a predetermined driving current to each of the movable mirror driving mechanism so as to set the angles of the movable mirror in a first state, and detecting a light position with the shift sensor. The method also includes checking whether or not a sensor output is produced, supplying a second driving current to each of the movable mirror drivers such that predetermined detection areas of the shift sensor are shifted, if the sensor output is not detected, and detecting the light position once again. The method also includes checking whether or not the sensor output is produced, supplying a third driving current to each of the movable mirror drivers such that the angles of the mirrors are adjusted and the sensor output is within a predetermined range, if the sensor output is detected, the third driving current having a smaller current value than the second driving current. The method also includes supplying a fourth driving current to each of the movable mirror drivers if adjacent detection areas of the shift sensor sense a light beam reflected by the movable mirrors whose angles have been adjusted, the fourth driving current being equivalent in direction to the third driving current and corresponding in amount to one control step of the third driving circuit.

The present invention still further provides an image forming apparatus comprising; an exposure apparatus that includes a first light source for emitting a fist light beam, a second light source for emitting a second light beam, and a deflection device for simultaneously deflecting the first and second light beams emitted from the first and second light sources across an image bearing body which bears a latent image thereon, the image bearing body being scanned with the first and second light beams in a first direction which is along an axial direction of the image bearing body. The apparatus includes a photodetector for sensing at least one of the first and second light beams deflected by the deflection device and for outputting an light detection signal corresponding to a position of the sensed light beam or beams. First and second mirror devices are provided for reflecting the first and second light beams emitted from the first and second light beams and traveling toward the deflection device, the first mirror device reflecting the first light beam in the first direction, and the second mirror device reflecting the second light beam in a second direction perpendicular to the first direction. A mirror driving device is provided for varying angles of mirrors of the first and second mirror devices in a predetermined direction in accordance with the light detection signal detected by the photodetector. A developing unit is provided for supplying a developing agent to the latent image formed on the image bearing body by the exposure apparatus, thereby forming a visualized image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 11A and 11B show an example of a method for controlling a mirror driving coil, which controls the position to which the laser beam shown in FIGS. 8 to 10 is guided.

DETAILED DESCRIPTION OF THE INVENTION

An embodiment of the present invention will now be described in detail with reference to the accompanying drawings.

Figure 1:
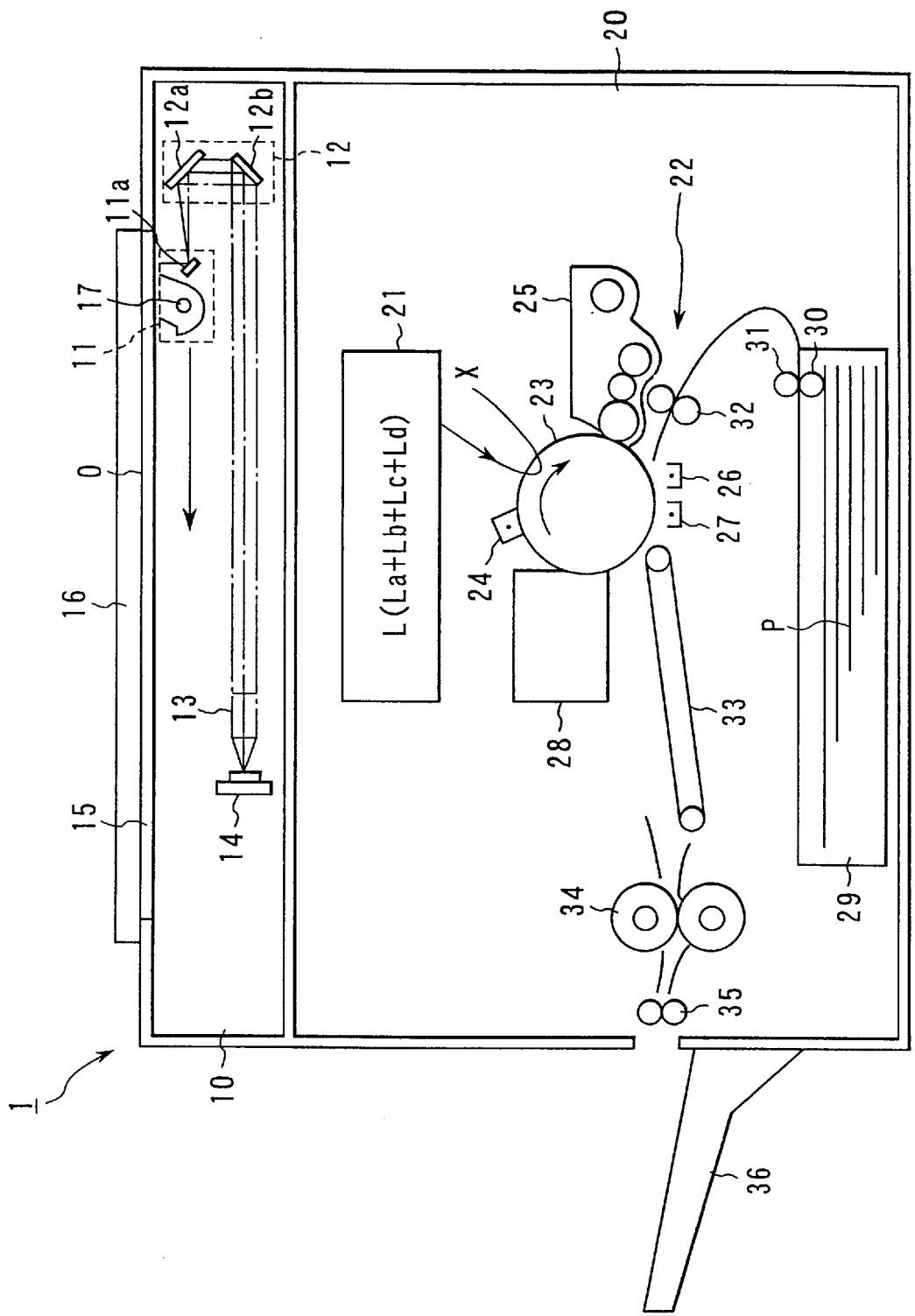
FIG. 1 is a schematic illustration showing a digital copying apparatus in which an exposure apparatus according to one embodiment of the present invention is incorporated.

FIG. 1 is a schematic illustration showing an image forming apparatus or digital copying apparatus in which a multi-beam exposure apparatus according to one embodiment of the present invention is incorporated. As shown in FIG. 1, the digital copying apparatus 1 has a scanner section 10 (which serves as an image reading means) and a printer section (which serves as an image forming means).

The scanner section 10 includes the following structural elements: a first carriage 11 which is movable in the direction indicated by the arrow; a second carriage 12 which is driven by the first carriage; an optical lens 13 for providing a predetermined focusing characteristic for light coming from the second carriage 12; a photoelectric conversion element 14 for photoelectrically converting the light provided with the predetermined focusing characteristic by the optical lens 13 into an electric signal and outputting the electric signal; a document table 15 on which a document O is placed; a document holding cover 16 with which the document O is pressed against the document table 15; etc.

The first carriage 11 is provided with a light source 17 for illuminating the document O, and a mirror 11a for reflecting light toward the second carriage 12. The light reflected by the mirror 11a is originally emitted from the light source 17 and reflected by the document O.

The second carriage 12 is provided with mirrors 12a and 12b. The former mirror 12a changes the traveling direction of light coming from the mirror 11a of the first carriage 11 by 90°, while the latter mirror 12b changes the traveling direction of that light by 90° again.

The document O placed on the document table 15 is illuminated by the light emitted from the light source 17, and the light reflected by the document O represents the dark and light portions of the document O. The reflected light of the document O passes by way of the mirrors 11a and 12a and is incident on the optical lens 13 and is used as image information on the document O.

The reflected light guided from the document O to the optical lens 13 is focused on the light receiving surface of the photoelectric conversion element 14 (e.g., a CAD sensor).

When a carriage driving motor (not shown) is turned on, the first and second carriages 11 and 12 move along the document table 15 at a relative speed of 2:1. As a result, the image information on the document O (i.e., the reflected light of the document O) is read such that the image information read at one time corresponds to a width that is predetermined in the direction in which the mirror 11a extends. Image information are sequentially acquired with respect to the direction perpendicular to the mirror extending direction. All image information on the document O are guided to the CAD sensor 14.

As described above, the image information on the original O laced on the document table 15 are processed by the CAD sensor 14 in such a manner that one line extending in the first direction (i.e., the mirror extending direction) is processed as one unit. In the image processing section, the image information corresponding to one line are converted into image density signals, such as an 8bit digital image signal.

The printer section 20 is provided with a multi-beam exposure apparatus 21 (which will be described later with reference to FIGS. 2 and 3), and an electrophotographic image forming section 22 capable of forming an image on a recording sheet P (which serves as an image formation medium).

The image forming section 22 has the following structural elements: a drum-shaped photosensitive body (hereinafter referred to as a photosensitive drum) 23 on which an electrostatic latent image corresponding to the image data (i.e., an image on the document O) is formed by irradiation of light beams from the multi-beam exposure apparatus 21; a charging unit 24 for providing the surface of the photosensitive drum 23 with a surface potential of a predetermined polarity; a developing unit 25 for selectively supplying toner (which serves as a visualizing agent) to the electrostatic latent image formed on the photosensitive drum 23 by the multi-beam exposure apparatus, thereby forming a toner image; a transfer unit 26 for transferring the toner image from the photosensitive drum 23 to a recording sheet P by applying an electric field to the toner image; a separating unit 27 for separating the recording sheet P (on which the toner image is transferred) and the toner (which exists between the recording sheet P ad the photosensitive drum 23) from the photosensitive drum 23 by releasing them from the electrostatic attraction by the photosensitive drum 23; a cleaning unit 28 for removing residual toner from the outer circumference of the photosensitive drum 23 and restoring the photosensitive drum in such a manner that the potential distribution on the surface of the photosensitive drum 23 changes back to the state assumed before the surface potential is provided by the charging unit 24; etc. The charging unit 24, the developing unit 25, the transfer unit 26, the separating unit 27 and the cleaning unit 28 are arranged in the rotating direction of the photosensitive drum 23 in the order mentioned (the rotating direction is indicated by an arrow in FIG. 1). Exposure beams (light beams) emitted from the multi-beam exposure apparatus 21 are radiated to the predetermined position X, which is located between the charging unit 24 and the developing unit 25.

Image signals read from the document O by the scanner section 10 are supplied to an image processing section (not shown). In this image processing section, the image signals are converted into print signals by executing gradation processing (which is performed for outline correction or half-tone image display). The image signals are also converted into laser modulation signals. The laser modulation signals are used for controlling the optical intensity of the laser beams emitted from the semiconductor laser elements (to be described below) of the multi-beam exposure apparatus 21 between two intensity levels. One of the intensity level is a level allowing an electrostatic latent image to be recorded on the outer circumference of the photosensitive drum 23 provided with a predetermined surface potential by the charging unit 24, while the other of the intensity level is a level that does not enable recording of the electrostatic latent image.

Each of the semiconductor laser elements of the multi-beam exposure apparatus 21 emits a light beam which is intensity-modulated in accordance with the laser modulation signals described above and which enables an electrostatic latent image corresponding to predetermined image data to be recorded at a predetermined position on the photosensitive drum 23. The light beam emitted from each semiconductor laser element is deflected in the first direction by the deflecting device (described below) of the multi-beam exposure apparatus 21. The first direction is a direction in which a reading line of the scanner section 10 extends. After being deflected in this direction, the light beam is radiated onto the predetermined position X on the outer circumference of the photosensitive drum 23.

The photosensitive drum 23 is rotated at the predetermined speed in the direction indicated by the arrow. In synchronism with this rotation, the first and second carriages 11 and 12 of the scanner section 10 move along the document table 7. In addition, the laser beams emitted from the semiconductor laser elements and sequentially reflected by the deflecting device are radiated onto the outer circumference of the photosensitive drum 23. The laser beams are radiated line by line and with a predetermined distance maintained between the adjacent lines.

In this manner, an electrostatic latent image corresponding to image signals is formed on the outer circumference of the photosensitive drum 23.

The electrostatic latent image formed on the outer circumference of the photosensitive drum 23 is developed by means of the toner supplied from the developing unit 25. Then, in accordance with the rotation of the photosensitive drum 23, the electrostatic latent image is conveyed to the position where it faces the transfer unit 26. At this position, it is transferred to a recording sheet P owing to the electric field applied by the transfer unit 26. The recording sheet P is one of the sheets that are taken out of a sheet cassette 29 one by one by means of a feed roller 30 and a separating roller 31 and are controlled in feed timing by aligning rollers 32.

The recording sheet P bearing the toner image transferred thereto is separated from the photosensitive drum 23 by a separation device 27, and is guided to a fixing unit 34 by means of a conveyor device 33.

The recording sheet P guided to the fixing unit 34 is subjected to heat and pressure, by which the toner image is fixed on the recording sheet P. Thereafter, the recording sheet P is discharged onto a tray 36 by discharging rollers 35.

After the toner image is transferred to the recording sheet P by the transfer unit 26, the photosensitive drum 23 continues to rotate, and the drum surface portion from which the toner image is transferred comes to the position where it faces the cleaning unit 28. The cleaning unit clears the drum surface of the residual toner, i.e., the toner that remains after the transfer operation. Then, the photosensitive drum 23 is restored in such a manner that the surface potential of the photosensitive drum 23 changes back to the state assumed before the surface potential is provided by the charging unit 24. Accordingly, the photosensitive drum 23 becomes ready for the next image forming operation.

A successive image forming operation is enabled by repeating the above process.

As described above, the document O placed on the document table 15 is read by the scanner section 10 to obtain image information, and this image information is converted into a toner image by the printer section 20 and output onto the recording sheet P. In this manner, a copy of the document O is made.

Figure 2:
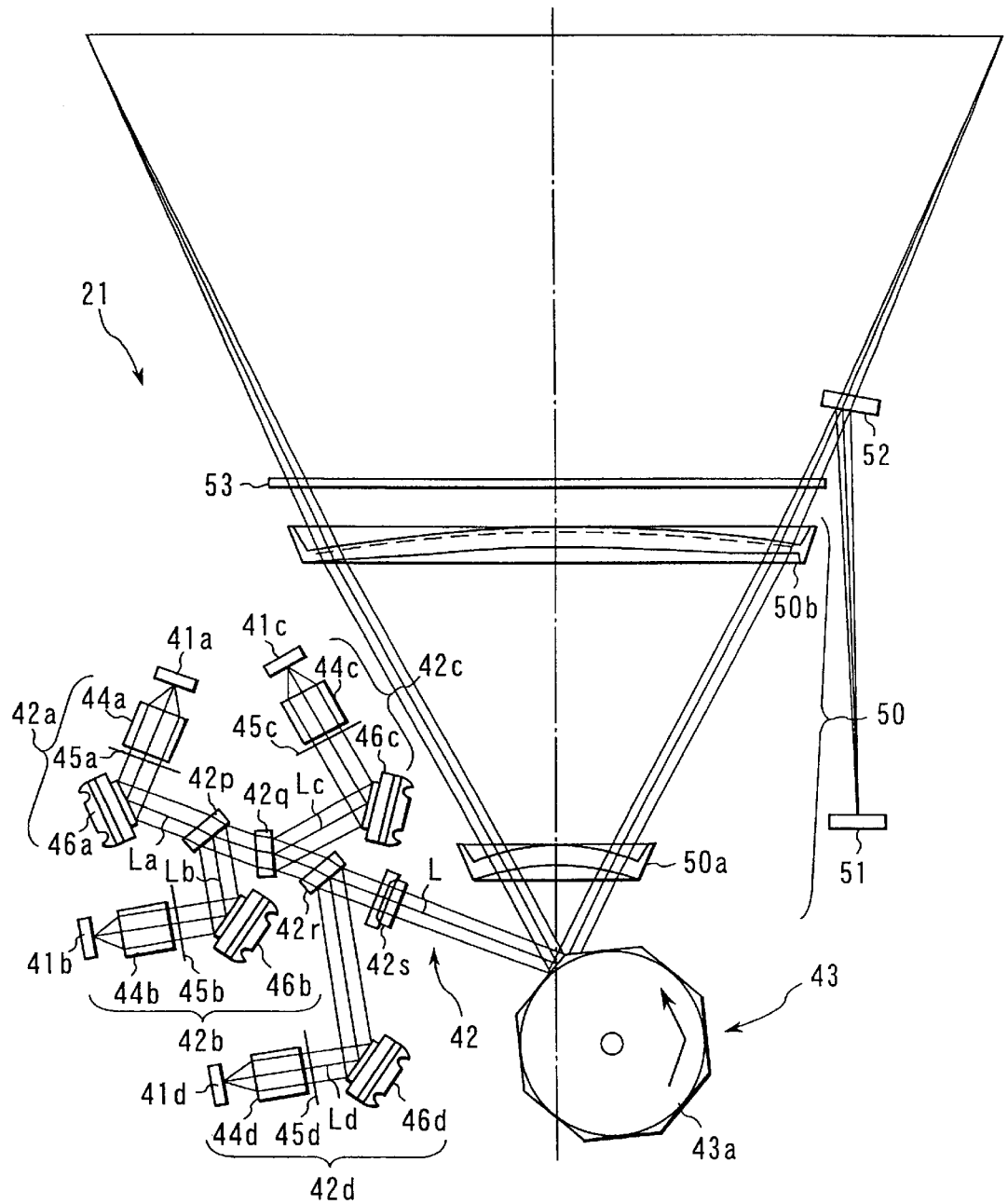
FIG. 2 is a schematic illustration showing the exposure apparatus incorporated in the copying apparatus depicted in FIG. 1.

FIG. 2 is a schematic plan view of the multi-beam exposure apparatus employed in the digital copying apparatus shown in FIG. 1. In FIG. 2, the housing (the main body frame) is not illustrated. Likewise, mirrors employed to reduce the size of the entire system and mirrors employed to guide the light beams to the photosensitive drum 23 are not illustrated. In the schematic plan view of FIG. 1, the paths of light beams are depicted as being in the same plane.

As shown in FIG. 2, the multi-beam exposure apparatus 21 includes first to fourth light sources 41a, 41b, 41c and 41d.

The first to fourth light sources 41a–41d are semiconductor laser elements for emitting laser beams La, Lb, Lc and Ld, respectively. The laser beams La, Lb, Lc and Ld emitted from the semiconductor laser elements 41a, 41b, 41c and 41d are made to pass through a prior-deflection optical system 42 (42a, 42b, 42c and 42d), and are then guided to the deflecting device. The prior-deflection optical system 42 includes sections provided for the laser beams La, Lb, Lc and Ld, respectively, and a section used in common to some or all of the four laser beams La, Lb, Lc and Ld. Those sections of the prior-deflection optical system 42 will be referred to, with suffixes "a", "b", "c" and "d" attached. Those sections of the prior-deflection optical system 42 used in common to some or all of the four laser beams La, Lb, Lc and Ld will be referred to, with suffixes "p", "q", "r" and "s" attached.

The prior-deflection optical system 42 (42a, 42b, 42c, 42d) is designed to control the cross sections (beam spots) of the laser beams La, Lb, Lc and Ld emitted from the laser elements 41a, 41b, 41c and 41d. The prior-deflection optical system 42 includes: finite-focus lenses 44a, 44b, 44c and 44d for providing a predetermined converging characteristic for the diverging laser beams emitted from the laser elements 41a, 41b, 41c and 41d; diaphragms 45a, 45b, 45c and 45d for controlling the laser beams La, Lb, Lc and Ld, which have passed through the finite-focus lenses 44a, 44b, 44c and 44d and have been provided with the converging characteristic, so that the laser beams La, Lb, Lc and Ld can have desired cross sections (beam spot shapes); and galvano-mirrors 46a, 46b, 46c and 46d serving as optical path-changing mechanisms. The galvano-mirrors 46a, 46b, 46c and 46d change the traveling directions of the laser beams La, Lb, Lc and Ld, the cross sections of which are controlled to have desired shapes, and guide the laser beams to the deflecting device 43. In addition to this, the galvano-mirrors 46a, 46b, 46c and 46d change the positions of the laser beams La, Lb, Lc and Ld traveling to the deflecting device 43 in the first direction, so that the lines along which the photosensitive drum 23 are scanned with the laser beams La, Lb, Lc and Ld are away from each other by a predetermined distance. A single lens is used as each of the finite-focus lenses 44a, 44b, 44c and 44d. The single lens is specifically an aspherical glass lens, or a spherical glass lens combined with a UV-setting (ultraviolet ray-setting) plastic aspherical lens. Each of the galvano-mirrors 46a, 46b, 46c and 46d is provided with an optical path-changing device capable of slightly changing the direction in which a laser beam is reflected. For example, each galvano-mirror is provided with a mirror surface-rotating mechanism.

The angles of the mirrors of the galvano-mirrors 46a, 46b, 46c and 46d are changed in an arbitrary direction independently of one another, by a galvano-mirror driving circuit 72 (i.e., a D/A converter). The galvano-mirror 72 will be described later with reference to FIG. 3.

The prior-deflection optical system 42 includes a first half-mirror 42p, a second half-mirror 42q, a third half-mirror 42r and a cylinder lens 42s, which are arranged at positions close to the deflecting device 43 in the order mentioned. The first half-mirror 42p synthesizes laser beam La, emitted from the first laser element 41a and reflected by the galvano-mirror 46a, with laser beam Lb, emitted from the second laser element 41b and reflected by the galvano-mirror 46b. The first half-mirror 42p synthesizes the two laser beams La and Lb in such a manner that the synthesized laser beam (La+Lb) looks like one line if viewed in a horizontal plane but looks like two lines spaced by a predetermined distance if viewed in the sub-scanning direction. The second half-mirror 42q synthesizes laser beam (La+Lb), obtained by the first half-mirror 42p, with laser beam Lc, emitted from the third laser element 41c and reflected by the galvano-mirror 46c. The second half-mirror 42q synthesizes the two laser beams (La+Lb) and Lc in such a manner that the synthesized laser beam (La+Lb+Lc) looks like one line if viewed in a horizontal plane but looks like two lines spaced by a predetermined distance if viewed in the sub-scanning direction. The third half-mirror 42r synthesizes laser beam (La+Lb+Lc), obtained by the second half-mirror 42q, with laser beam Ld, emitted from the fourth laser element 41d and reflected by the galvano-mirror 46c. The third half-mirror 42r synthesizes the two laser beams (La+Lb+Lc) and Ld in such a manner that the synthesized laser beam (La+Lb+Lc+Ld) looks like one line if viewed in a horizontal plane but looks like two lines spaced by a predetermined distance if viewed in the sub-scanning direction. The cylinder lens 42s converges laser beam (La+Lb+Lc+Ld), obtained by the third half-mirror 42r, in the sub-scanning direction.

In the manner described above, the laser beams L (=La+Lb+Lc+Ld) are spaced from one another by a predetermined distance only in the sub-scanning direction by the first half-mirror 42p, the second half-mirror 42q and the third half-mirror 42r. The resultant laser beams pass through the cylinder lens 42s, and are then incident on the deflecting device 43. By the polygonal mirror 43a of this deflecting device 43, the laser beams L are deflected simultaneously, and are focused on the predetermined position of the photosensitive drum 23.

The deflecting device 43 has a polygonal mirror 43a and a motor (not shown). The polygonal mirror 43a is an octahedral type; it has eight flat reflecting surfaces arranged to form a regular polygon. The motor rotates the polygonal mirror 43a in the main scanning direction (i.e., the second direction) at a predetermined speed.

A post-deflection optical system 50, a beam position sensor 51, a beam-bending mirror 52 and a dust-preventing glass member 53 are arranged between the deflecting device 53 and an image plane. (The image plane is located at a position corresponding to the exposure position X on the outer circumference of the photosensitive drum 23, and is a focal plane determined at the time of design.) The post-deflection optical system 50 includes a two-lens optical system which is made up of first and second focusing lenses 50a and 50b and which provide predetermined optical characteristics for the laser beams L (=La+Lb+Lc+Ld) deflected by the reflecting surfaces of the polygonal mirror 43a of the deflecting device 43. The beam position sensor 51 senses whether or not the laser beams La, Lb, Lc and Ld emerging from the second focusing lens 50b of the post-deflection optical system 50 have reached a predetermined position, and reached timing of each of the laser beams La, Lb, Lc and Ld which is located between the second focusing lens 50b and the image write position. In other words, the beam position sensor 51 provides information regarding when the laser beams reach the predetermined position, and where that predetermined position is. The beam-bending mirror 52 is arranged between the post-deflection optical system 50 and the beam position sensor 51 and reflects part of the four laser beams L emerging from the post-deflection optical system 50 to the beam position sensor 51 such that the reflected beams travel in directions that are different in both the main scanning direction and sub-scanning direction. The dust-preventing glass member 53 serves to provide a hermetic seal between the multi-beam exposure apparatus 21 and the printer section 20. The beam position sensor 51 has a light-receiving surface, and this surface is an equivalent image plane (which can be regarded as being located away at the same position as the outer circumference of the photosensitive drum 23 in terms of the optical distance) and corresponds in position to an end portion of the photosensitive drum 23. As will be detailed later with reference to FIG. 13, the beam position sensor 51 has first and second detection areas 51-a and 51-b used mainly for coarse adjustment, and a third detection area 51-c used mainly for fine adjustment.

A description will now be given with reference to FIG. 3 as to how the exposure apparatus shown in FIG. 2 is controlled.

Figure 3:
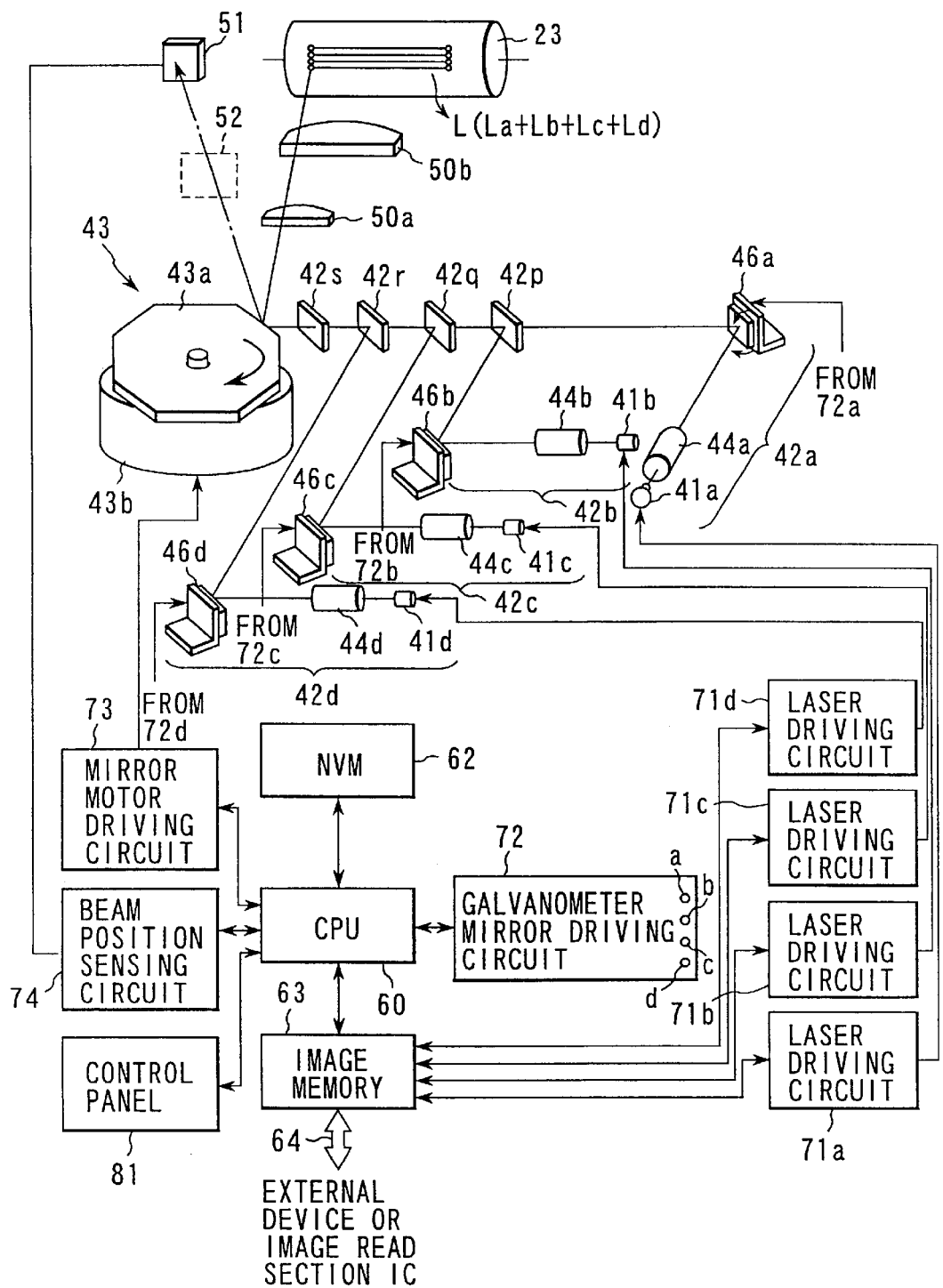
FIG. 3 is a schematic block diagram showing the control system of the exposure apparatus shown in FIG. 2.
Figure 4A:
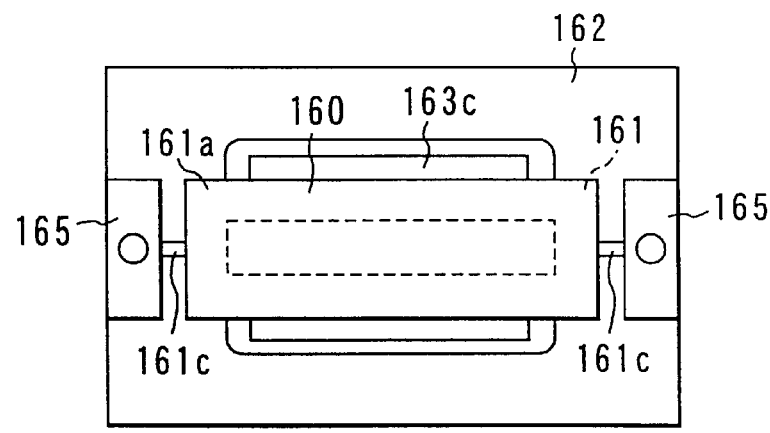
FIGS. 4A, 4B and 4C are schematic illustrations each show a galvano-mirror incorporated in FIG. 2.
Figure 4B:
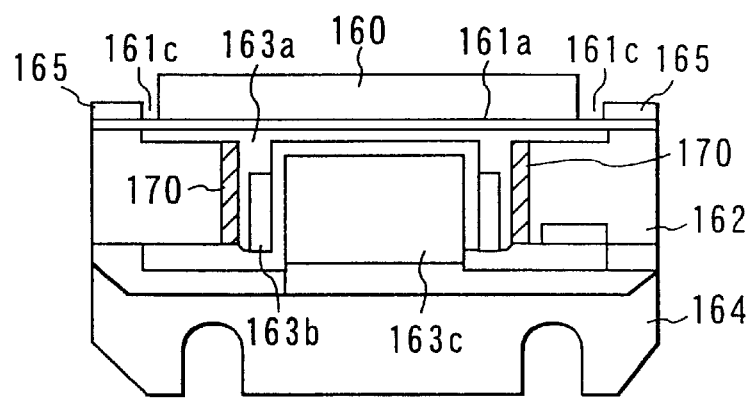
Figure 4C:
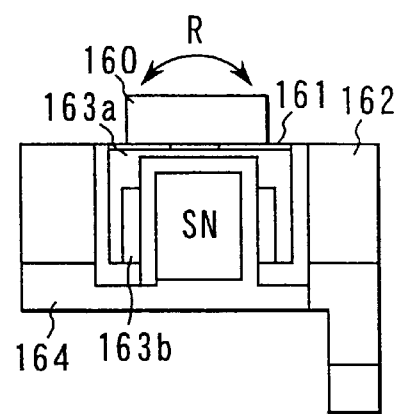
Figure 5:
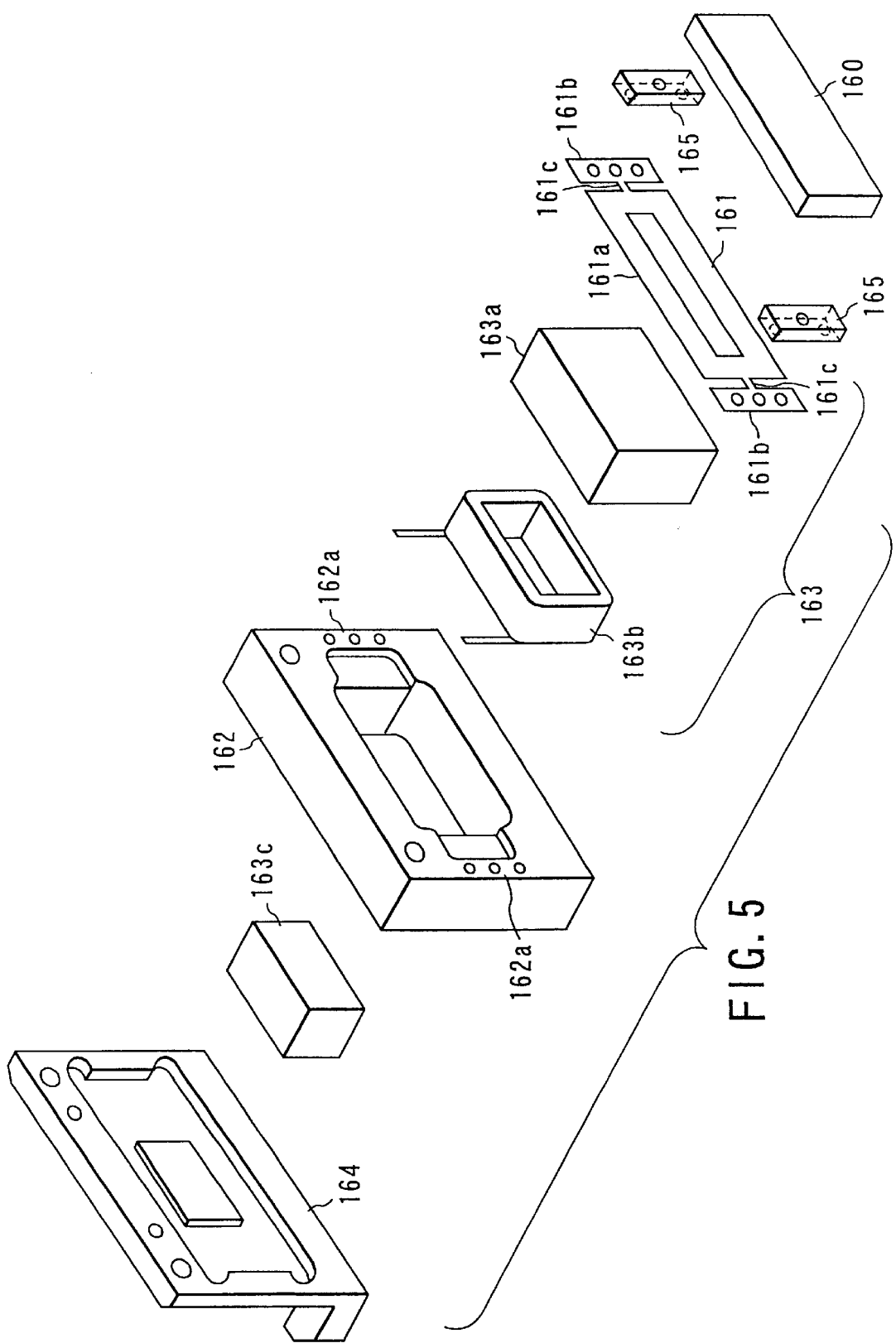
FIG. 5 is an exploded perspective view showing the structure of the galvano-mirror shown in FIG. 4.

As shown in FIG. 3, the semiconductor laser elements 41a to 41d are driven by laser driving circuits 71a to 71d, respectively. They emit image exposure beams (laser beams) La, Lb, Lc and Ld at predetermined timings described below, and the laser beams La, Lb, Lc and Ld are controlled in optical intensity in accordance with image data. The semiconductor laser elements 41a to 41d do not emit laser beams until the rotating speed of the polygonal mirror 43a of the deflecting device 43 reaches a given speed. When the mirror motor (not shown) of the deflecting device 43 outputs a PLL (phase loop lock) signal or another signal indicative of the stable state of the rotation, predetermined control commands are supplied to the laser driving circuits 71a to 71d under the control of CPU 60, as a result of which the laser driving circuits 71a to 71d are actuated. When the laser driving current has reached a predetermined level, laser beams La, Lb, Lc and Ld are emitted. The laser beams La, Lb, Lc and Ld have such an optical intensity as enables an electrostatic latent image to be written on the photosensitive drum 23, provided that a predetermined surface potential SP is applied to the photosensitive drum 23 and a predetermined developing bias voltage is applied to the developing roller of the developing unit 25 and that the rotating angle of the polygonal mirror 43a of the deflecting device 43 enables the laser beams La, Lb, Lc and Ld to be deflected to the predetermined positions on the photosensitive drum 23.

The galvano-mirrors 46a to 46d will be described in detail with reference to FIGS. 4A, 4B, 4C, 4D and 5. As shown in these Figures, each galvano-mirror includes a leaf spring 161 which holds a mirror 160 in such a manner that the angle of the mirror 160 is variable, and a frame 162 which supports the leaf spring 161 in such a manner that the leaf spring 161 is movable in a desired direction.

The leaf spring 161 is provided with a propulsion unit 163 for generating a force used for displacing the leaf spring 161. The propulsion unit 163 is made up of a bobbin 163a and a coil 163b arranged inside the bobbin 163a. Inside the frame 163b, a magnet 163c is arranged, with a certain gap maintained between the frame 163b. The magnet 163c is integral with a fixing plate, by means of which the frame 162 is coupled to the predetermined position of the housing (not shown) of the exposure device 21. When a current is supplied to the coil 163b, the magnet 163c generates a magnetic field that moves the bobbin 163a, i.e., the leaf spring 161, to a certain degree. The frame also functions as a yoke that constitutes a magnetic circuit for the magnetic fluxes from the magnet 163c.

The leaf spring 161 has two surfaces, one of which is a supporting surface 161a for supporting the mirror 160 and the other is a holding surface 161b used for the connection to the frame 162. The leaf spring 161 has two torsion bar portions 161c, which are twisting portions that couple the supporting surface 161a and the holding surface 161b together. Owing to the torsion bar portions 161c, the leaf spring 161 can be twisted in the directions indicated by arrow R. The leaf spring 161 is made of a beryllium-copper alloy (which is widely used as a spring material), stainless steel SUS304 for springs, or the like.

The leaf spring 161 is secured together with spring pushes 165 formed of resin, by means of screws (not shown) inserted into the screw holes 162a formed in the frame 162. The gap between the frame 162 and the bobbin 163a is filled with a dampening agent 170, such as silicone gel, so as to prevent the mirror 160 from vibrating due to external vibration.

The galvano-mirrors 46a to 46d operate as follows. The D/A converter (galvano-mirror driving circuit) 72 is supplied with a current of predetermined polarity in accordance with the value (e.g., a 14-bit value) indicated by the CPU 60. In other words, the voltage corresponding to the indicated value is applied to the coil 163b. As a result, an electromagnetic force is generated between the coil 163 and the magnet 163c. In response to this force, the leaf spring 161 is twisted, rotating the mirror 160 in the directions indicated by arrow R. When the polarity of the current is reversed (i.e., when the current is made to flow in the opposite direction), the rotating direction of the mirror 160 is reversed. The angle of rotation (i.e., the degree to which the mirror is rotated) can be varied in proportion to the current value. The mirror 160 can be kept at the rotated position by maintaining the supply of the current.

When image formation is executed or in the initial state of the image forming apparatus, the mirrors 160 of the galvano-mirrors 46a, 46b, 46c and 46d operate on the basis of the detection signals supplied from the beam position sensor 51. By this operation of the mirrors 160, the positions to which the laser beams La, Lb, Lc and Ld from the laser elements 41a, 41b, 41c and 41d are radiated in the sub-scanning direction, using the positions sensed by the beam position sensor 51 as a reference.

When the galvano-mirrors are put to practice, the following problem has to be considered. If the coil 163b of each of the galvano-mirrors 46a to 46d is kept supplied with a current, the viscosity of the dampening agent is lowered by a temperature increase caused by the heat generated by the coil 163b. In addition, the magnetic force provided by the magnetic circuit varies due to the temperature increase. As a result, the relationships between the current flowing through the coil 163b and the angle of rotation of the mirror change with time. The variation in the angle of rotation of the mirror 160 is generally referred to as a drift phenomenon or simply as a drift.

Figure 6:
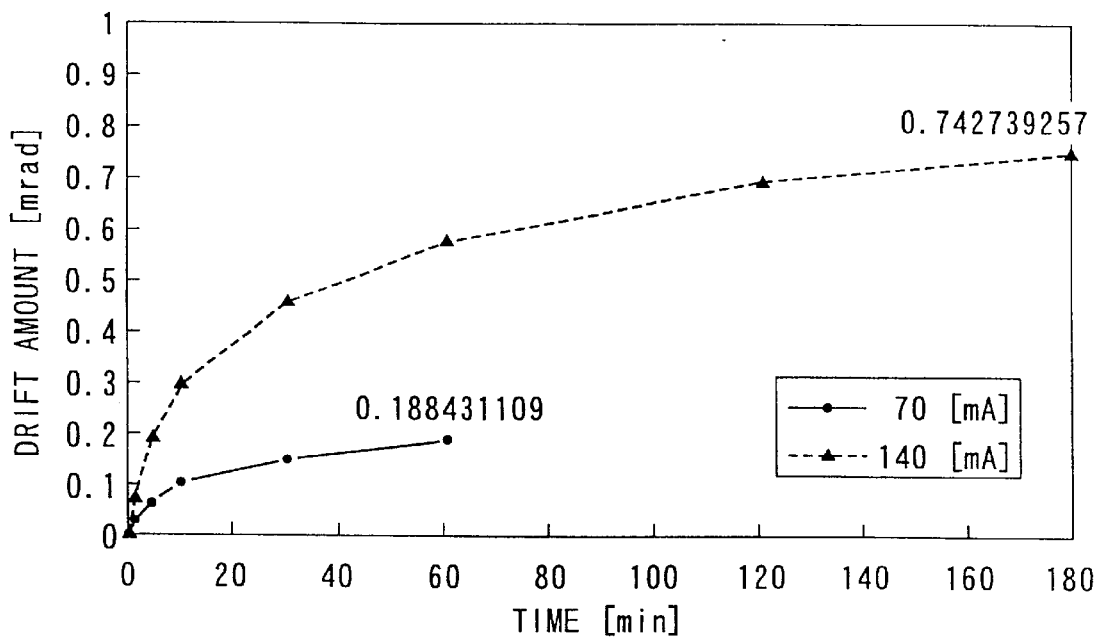
FIG. 6 is a graph showing the relationships between the coil driving current and the extent of drift occurring in the galvano-mirror shown in FIGS. 4 and 5.

As shown in FIG. 6, the amount of drift increases in accordance with an increase in the amount of current flowing through the coil 163b, and the direction of drift corresponds to the polarity of the current. The absolute value of the drift can be defined based on the weight of the mirror 160, the thickness of the leaf spring 161, the width of the torsion bar portions 161c, the current value of the current flowing through the coil 163b, the density of the magnetic fluxes from the magnet 163c, etc. The drift amount of the mirror 160 varies within a range determined by the arrangement of the lenses or optical elements of the exposure apparatus 21. The drift amount starts to vary from the time when the coil 163b is continuously supplied with a current. In the arrangement shown in FIG. 2, the drift amount is approximately 1 μm when the time during which the coil 163b is kept supplied with a current is 50 msec. (Although the increment of the drift amount may vary, the time required before the saturation of the drift amount [i.e., before the drift amount becomes constant] is determined in units of one day.)

More specifically, the effect of the drift of the mirror 160 of each galvano-mirror 46 (a, b, c, and d) can be expressed in terms of the distance for which a laser beam moves on the image plane (i.e., the outer circumference of the photosensitive drum 23) during the time corresponding to one step 14 bit of the driving voltage applied to the coil 163b. Assuming that the resistance of the coil 163b is 78Ω and the sensitivity is 0.196 mrad/mA, the moving distance in question is 0.763 μm when the maximal current value that can be supplied to the coil 163b is ±133.3 mA and the maximal angle of rotation of the mirror 160 is ±126.13 mrad.

Since the position sensing operation is repeated a plurality of times, the adjustment of the angle of the mirror 160 requires a long time. In addition, if this adjustment operation is repeated, the position of the mirror 160 cannot be definitely determined.

Figure 8:
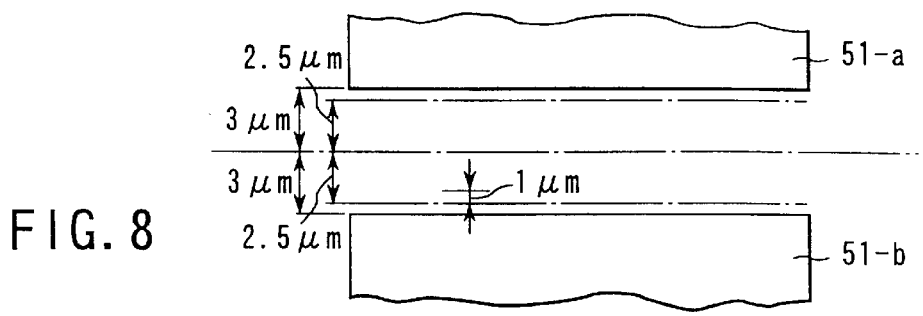
FIG. 8 is a schematic view showing how the position to which a laser beam is guided is shifted due to the drift of the galvano-mirror shown in FIGS. 4 and 5.
Figure 13:
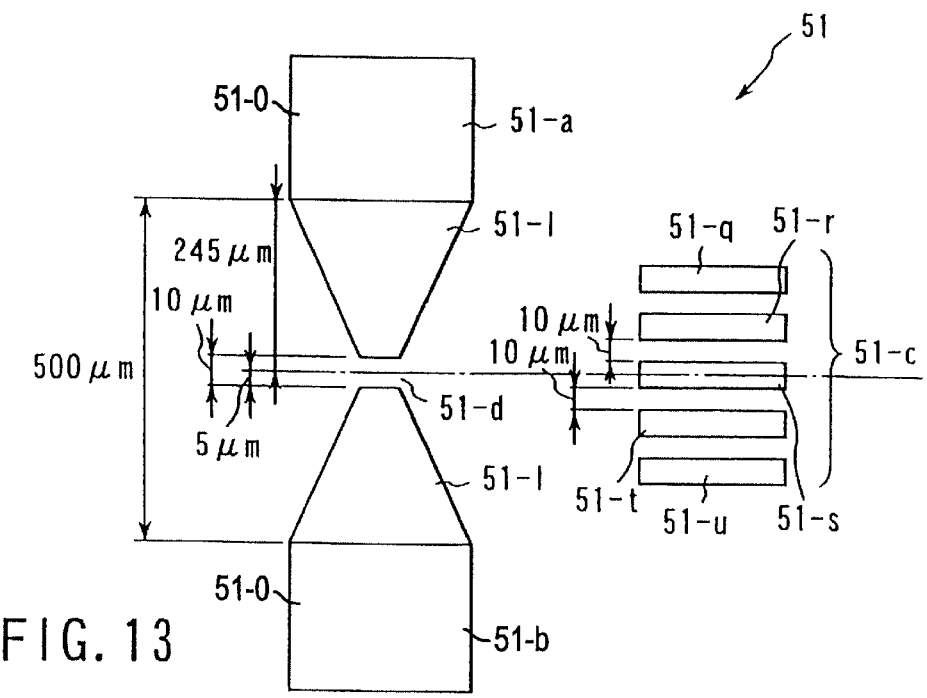
FIG. 13 is a schematic illustration showing features of the detection areas of the beam position sensor incorporated in the exposure apparatus shown in FIG. 2.

As shown in FIG. 13, the beam position sensor 51 has five band-shaped detection areas 51-q, 51-r, 51-s, 51-t and 51-u, each having a width of 32.2 μm, and two rectangular areas 51-*a* and 51-*b*, which are arranged to provide a gap of 10 μm therebetween, and that approximately 10 msec is required for the beam position sensing circuit 74 (FIG. 3) to detect whether or not the beam position is within an allowable range or not. In this system, there may be case where the beam position is detected five times to prevent a malfunction due to noise or the like. As shown in FIG. 8, the gap between the detection areas 51-*a* and 51-*b* is at least 6 μm or so, and that a laser beam reflected by the mirror 160 and guided to the image plane (photosensitive drum 23) of the polygonal mirror 43*a* of the deflecting device 43 is confined to a position which is 2.5 μm away from the center of the region between detection areas 51-*a* and 51-*b* and which is located closer to detection area 51-*b* than detection area 51-*a*, i.e., at a position 0.5 μm away from detection area 51*b*. In this system, there may be case where the current supplied to the coil 163*b* flows in such a direction as deflects the laser beam toward detection area 51-*b*.

In these two cases, the laser beam is moved 1 μm toward detection area 51-*b* when the fifth detecting operation is performed (i.e., when a period of 50 msec has passed). When this happens, the angle of the mirror 160 is adjusted in such a direction as to move the laser beam toward detection area 51-*a*, by applying an adjusting voltage corresponding to a minimum adjustment value. If a period of 50 msec is required for the execution of the next detecting operation, the laser beam is moved again toward detection area 51-*b*.

The drift amount described above (1 μm/50 msec) may decrease to half or become 1.5 times greater due to the operating conditions of the galvano-mirror, such as variations in the ambient temperature and fluctuations in the power supply voltage. Accordingly, the minimum moving distance of the laser beam may vary. Since the sensitivities of the galvano-mirrors 46*a*–46*d* vary independently of one another, the minimum moving distance of a laser beam may differ in multiple ways.

Figure 9:
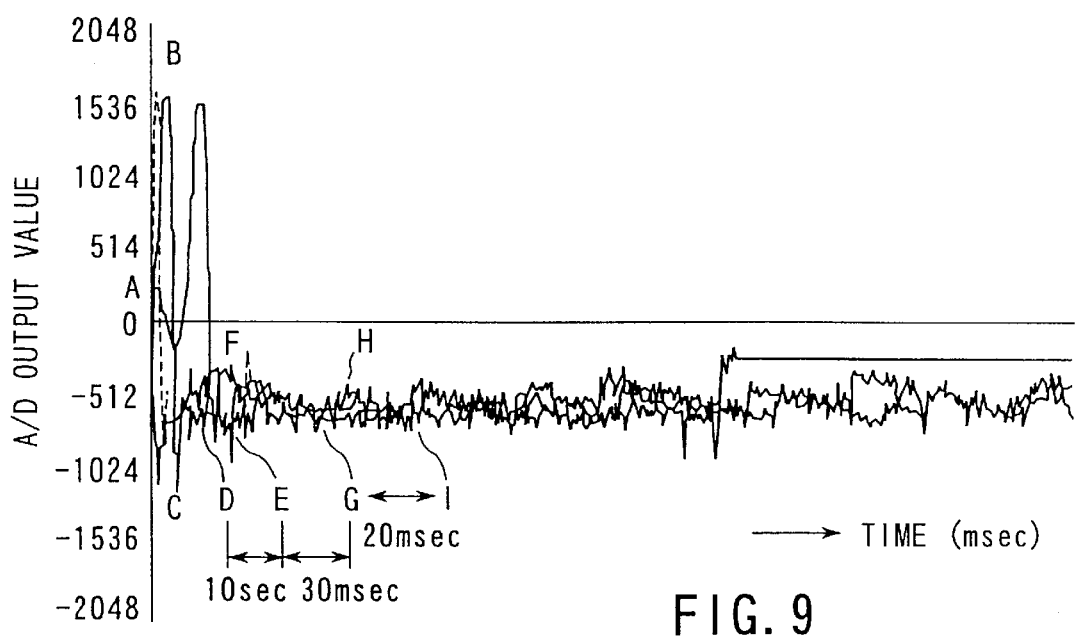
FIG. 9 shows a state in which the position to which a laser beam is guided is not definitely determined due to the drift of the galvano-mirror shown in FIGS. 4 and 5, the state being indicated in relation to changes in the amount of coil driving current (or the output voltage of the D/A converter) supplied to the driving coil of the galvano-mirror.
Figure 10:
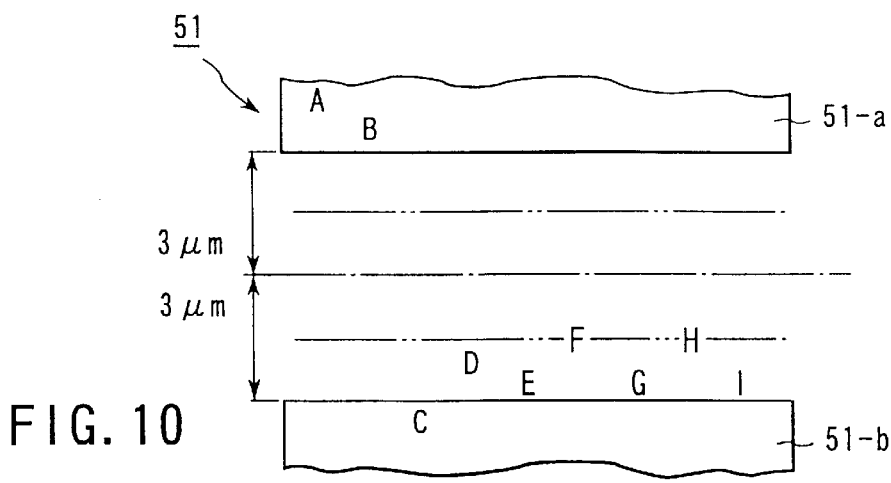
FIG. 10 is a schematic view showing how a laser beam varies in position due to variations in the coil driving current supplied to the driving coil of the galvano-mirror shown in FIG. 9.

FIG. 9 shows a state in which the position or angle of the galvano-mirror described with reference to FIG. 8 is not stable. In the graph in FIG. 9, the sensor current corresponding to the region between detection areas 51-*a* and 51-*b* is plotted against the axis of ordinate. FIG. 10 is a schematic illustration showing how a laser beam varies in position when the sensor current indicated in FIG. 9 is output.

The data shown in FIGS. 9 and 10 were obtained when the range to which a laser beam was confined (i.e., the range of the position to which the laser beam was guided by varying the angle of the mirror 160 of the galvano-mirror) was ±3 μm and the sensor output was monitored at the intervals of 10 msec. When the laser beam was located at position A which was at an end of detection area 51-*a* at the start of control, it moved to position B which was in the center of detection area 51-*a* after a lapse of 10 msec (after movement of 15.2 μm [=0.76 μm×20]). This can be confirmed from the data shown in FIGS. 9 and 10.

From the data shown in FIGS. 9 and 10, it can be confirmed that the laser beam moved to position C after the confinement control (which is performed by tilting the angle of the mirror 160).

If, at the moment, the mirror is tilted in the opposite direction, the position to which the laser beam is guided can be moved toward detection area 51-*a* (predictive control). If, as a result of this control, the laser beam moves to position D, which corresponds to the lower limit of the range of ±3 μm, the position to which the laser beam is guided next is E, due to an increase in the drift amount. Position E is closer to detection area 51-*b* than position D, and is beyond the beam confinement range. If the laser beam is guided to position E, then the mirror 160 is tilted in the opposite direction once again. If, as a result of this predictive control, the laser beam moves to position F, which is in the neighborhood of position D, the drift of the mirror 160 becomes a problem. Since it results in a slight shift in the position of the laser beam, it is very likely that movement (G→H→I) of the beam position will be repeated. In other words, the beam position becomes indefinite.

FIGS. 11A and 11B are schematic illustrations showing the relationships between the results of beam confinement (the angle control of the mirror 160) and the drift amounts.

The data shown in FIGS. 11A and 11B are data obtained when the beam position sensor 51 including the detection areas shown in FIGS. 8 and 10 is employed. Referring to the Figures, the confinement direction indicated by "+ (DOWN)" refers to the case where the beam position moves from detection area 51-*a* (depicted in the upper portions of the drawings) toward detection area 51-*b* (depicted in the lower portions of the drawings) and is eventually located within the confinement range. The confinement direction indicated by "− (UP)" refers to the converse case. The designation value (14 bit value) supplied to the D/A converter 72 is "±0V" when the 14 bit value indicated by CPU 60 is "2000", "negative voltage" when it is not more than "1FFF", and "positive voltage" when it is not less than "2001."

As described above, the polarity of the voltage (coil current) applied to the coil 163*b* (the driving section of the mirror 160) of the propulsion unit 163 of the galvano-mirror 46 corresponds to the direction of drift. Therefore, if the polarity of the voltage applied to the coil 163*b* is expressed by "+(DESIGNATION 14 bit VALUE TO D/A CONVERTER 72; NOT LESS THAN 2001)", then the direction of drift is from detection area 51-*b* to detection area 51-*a* (both areas being shown in FIG. 10). Likewise, if the polarity of that voltage is expressed by "−(DESIGNATION 14 bit VALUE TO D/A CONVERTER 72; NOT MORE THAN 1FFF)", then the direction of drift is from detection area 51-*a* to detection area 51-*b*.

In FIGS. 11A and 11B, if the confinement result is "UPWARD PATTERN", this indicates that the laser beam is located in the "1.5–3.0 μm" region between detection area 51-*a* and the center line of the region between detection areas 51-*a* and 51-*b*. If, on the other hand, the confinement result is "DOWNWARD PATTERN", this indicates that the laser beam is located in the "1.5–3.0 μm" region between detection area 51-*b* and the center line. If the drift control is "+CONFINEMENT", this indicates that the designation value (coil current) supplied to the D/A converter 72 is set as "+" (i.e., the position to which the mirror 160 reflects the laser beam is shifted from detection area 51-*a* toward detection area 51-*b*) and the laser beam is shifted a minimal distance. If the drift control is "−CONFINEMENT", this indicates that the designation value (coil current) supplied to the D/A converter 72 is set as "−" (i.e., the position to which the mirror 160 reflects the laser beam is shifted from detection area 51-*b* toward detection area 51-*a*) and the beam is shifted a minimal distance. There are eight control patterns, which are at "α", "β", "γ", "δ", "ε", "ζ", "η" and "θ". When, as a result of the confinement, the laser beam is located within the ±1.5 μm range with reference to the center line of the region between the detection areas, further control confinement) is suppressed.

The control shown in FIGS. 11A and 11B will be described in relation to the laser beam shift shown in FIG.

10. Let us assume that the designation value supplied to the D/A converter 72 is 2414(14 bit), and that the confinement direction is "−(UP)" (−CONFINEMENT). In this case, laser beam position D shown in FIG. 10 drifts to position E after a lapse of 10 msec. To confine the laser beam at position E, the designation value to the D/A converter 72 is set to be 2413(14 bit), thereby moving the laser beam to position F. However, the laser beam drifts again to position G after a lapse of 30 msec.

Subsequently, the designation value supplied to the D/A converter 72 is set to be 2412(14 bit). In other words, the control is switched to "−CONFINEMENT" so as to move the laser beam to position H. Despite this control, however, the laser beam drifts again to position I. As can be seen from this, the position of the laser beam cannot be definitely determined.

Even where the position of a laser beam can be definitely determined ("convergent" confinement), there may be another problem if a plurality of laser beams are utilized. To be more specific, the laser beams may be radiated to different positions at the start of the emission. In addition, the mirrors 160 of the galvano-mirrors 46 may differ in light of their unit moving distances (sensitivities). Due to these, the laser beams are confined to predetermined ranges in different periods of time. Let us assume that one control step starts from the detection of laser beams La, Lb, Lc and Ld (the detection of sensor outputs) and ends to the changing of the angles of the mirrors of the galvano-mirrors 46, and that the angles of the mirrors 160 are sequentially controlled for the respective laser beams in a time sharing manner, as in the order of La→Lb→Lc→Ld→La→Lb . . . . In this case, the drift due to temperature variations may vary the angle of a mirror after the angles of all mirrors, including that mirror, are determined. Needless to say, the angles of the mirrors need not be controlled in a time sharing manner. In other words, target mirror angles may be individually determined in accordance with the corresponding laser beams and sequentially supplied to the D/A converter 72. If this method is adopted, however, the adverse effects of the drift are more marked.

Figure 12:
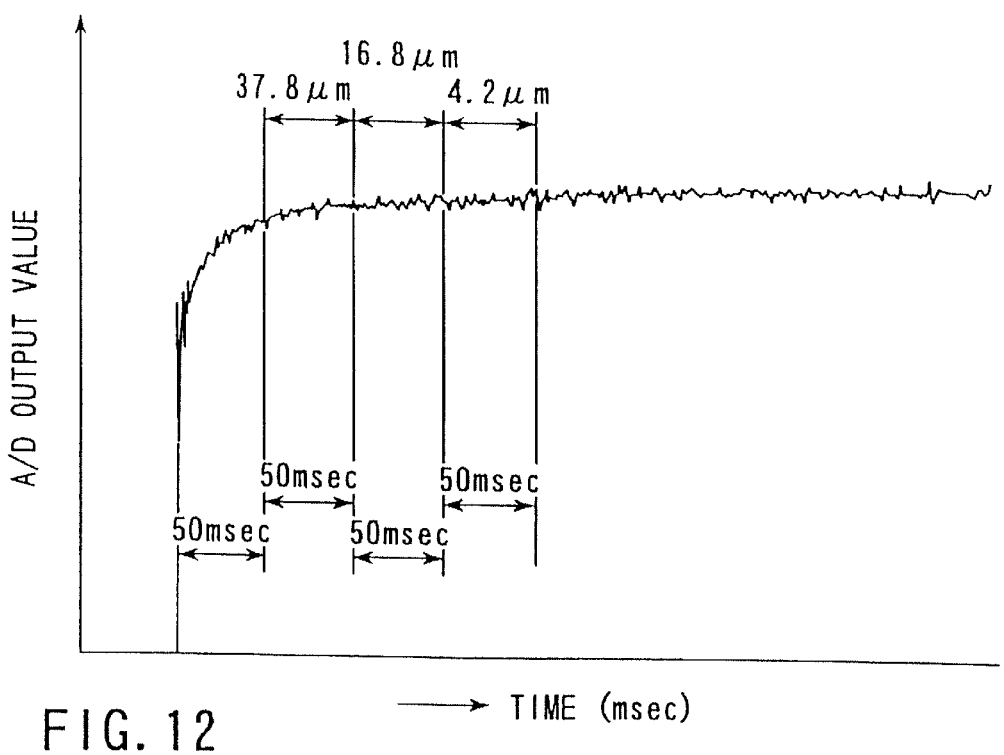
FIG. 12 is a graph showing the relationships between the extent of drift and the current supply time during which a coil driving current is supplied to the driving coil of the mirror driving mechanism of the galvano-mirror shown in FIGS. 8 to 10.

FIG. 12 is a graph showing the relationships between the extent of drift and the current supply time during which the coil of the mirror driving mechanism of a galvano-mirror is kept supplied with a current.

Figure 7:
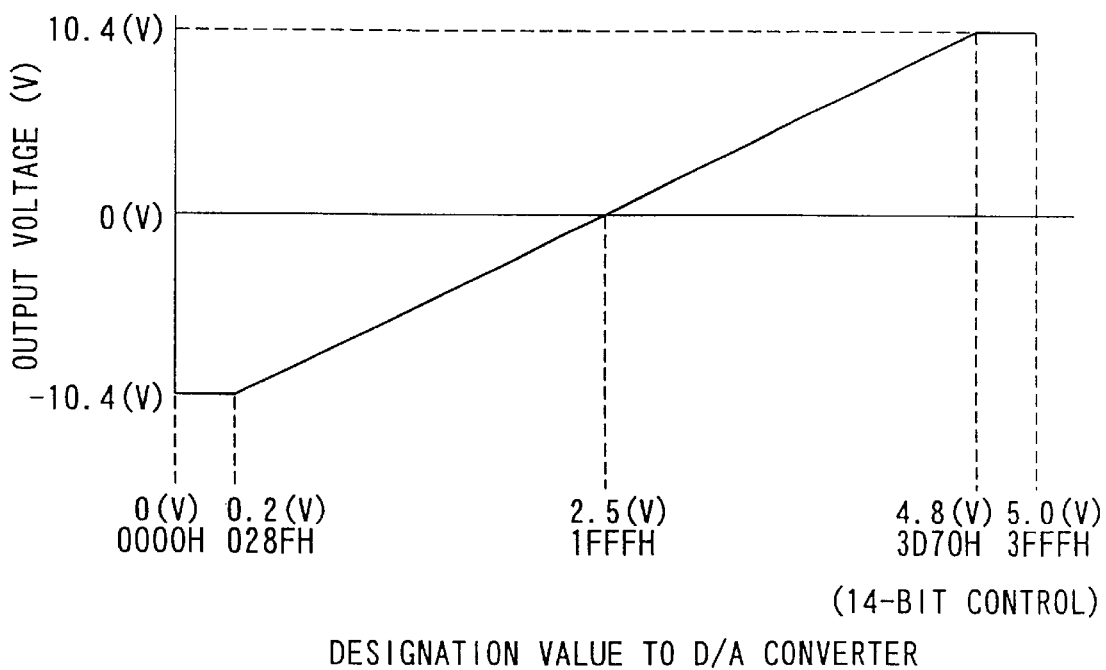
FIG. 7 shows the relationships between a coil terminal voltage applied to the coil of the galvano-mirror shown in FIGS. 4 and 5 and an output from a D/A converter.

Referring to FIG. 12, a voltage of 5V is applied to the coil 163b, with the designation value to the D/A converter 72 being set at "3FFF(14 bit)" (see FIG. 7). The drift amount is measured at the intervals of 50 msec. As indicated in FIG. 12, the drift amount corresponding to the first 50 msec period starting from the start of the current supply is about 38 μm, the drift amount corresponding to the second 50 msec period is about 18 μm, and the drift amount corresponding to the subsequent 50 msec period is about 4 μm. As can be seen from this, the adverse effects caused by the drift are entirely different between the case where the image forming apparatus in the "cold" state is turned on (for example, when it is turned on in the morning after not being used all night) and the case where the image forming apparatus in the "warm" state is turned on (for example, when it is turned on after being kept off for only a short period of time). Naturally, the length of time needed for control of laser beam positions differs between the two cases. Even when image formation is executed after a lapse of the same length of time from the actuation of the image forming apparatus, the distances between the laser beams guided to the image plane (photosensitive drum) are not uniform between the above cases. If the current supply to the image forming apparatus and the control of the beam position control are constantly monitored, the drift can be suppressed to a certain degree. This method, however, results in an increase in the power consumed when the apparatus is not used.

FIG. 13 is a schematic illustration showing features of the detection areas of the beam position sensor.

As shown in FIG. 13, the beam position sensor 51 has three types of detection areas, namely, first and second detection areas 51-a and 51-b used for coarse adjustment, and a plurality of third band-shaped detection areas arranged between the first and second detection areas and used for fine adjustment. Each of the detection areas 51a and 51b for coarse adjustment is provided with a laser beam detection section 51-0 for detecting whether or not a laser beam reaches the sensor 51 and a confinement section 51-1 used for "+CONFINEMENT" and "−CONFINEMENT" (both of which are illustrated in FIGS. 11A and 11B). When the laser beam is guided in the confinement section, the corresponding detection area outputs a current determined in accordance with the position of the laser beam. The total size of first and second detection areas 51-a and 51-b combined is 500 μm, for example, and the insensitive area 51d, which is a gap between the first and second detection areas, is 10 μm. The third detection area 51-c includes band-shaped detection areas 51-q, 51-r, 51-s, 51-t and 51-u, and these band-shaped areas are arranged at the intervals of 10 μm. The center line of detection area 51-s, as viewed in the widthwise direction thereof, corresponds in position to the center of the gap between first and second areas 51-a and 51-b.

A description will now be given as to how the beam position sensor shown in FIG. 13 adjusts the position to which a laser beam is guided. In the description below, the operation for confining laser beams to the region between the first and second detection areas will be referred to as "coarse adjustment", and the operation for confining the laser beams to a narrower region in such a manner that the laser beams are spaced at regular intervals will be referred to as "fine adjustment."

Figure 14:
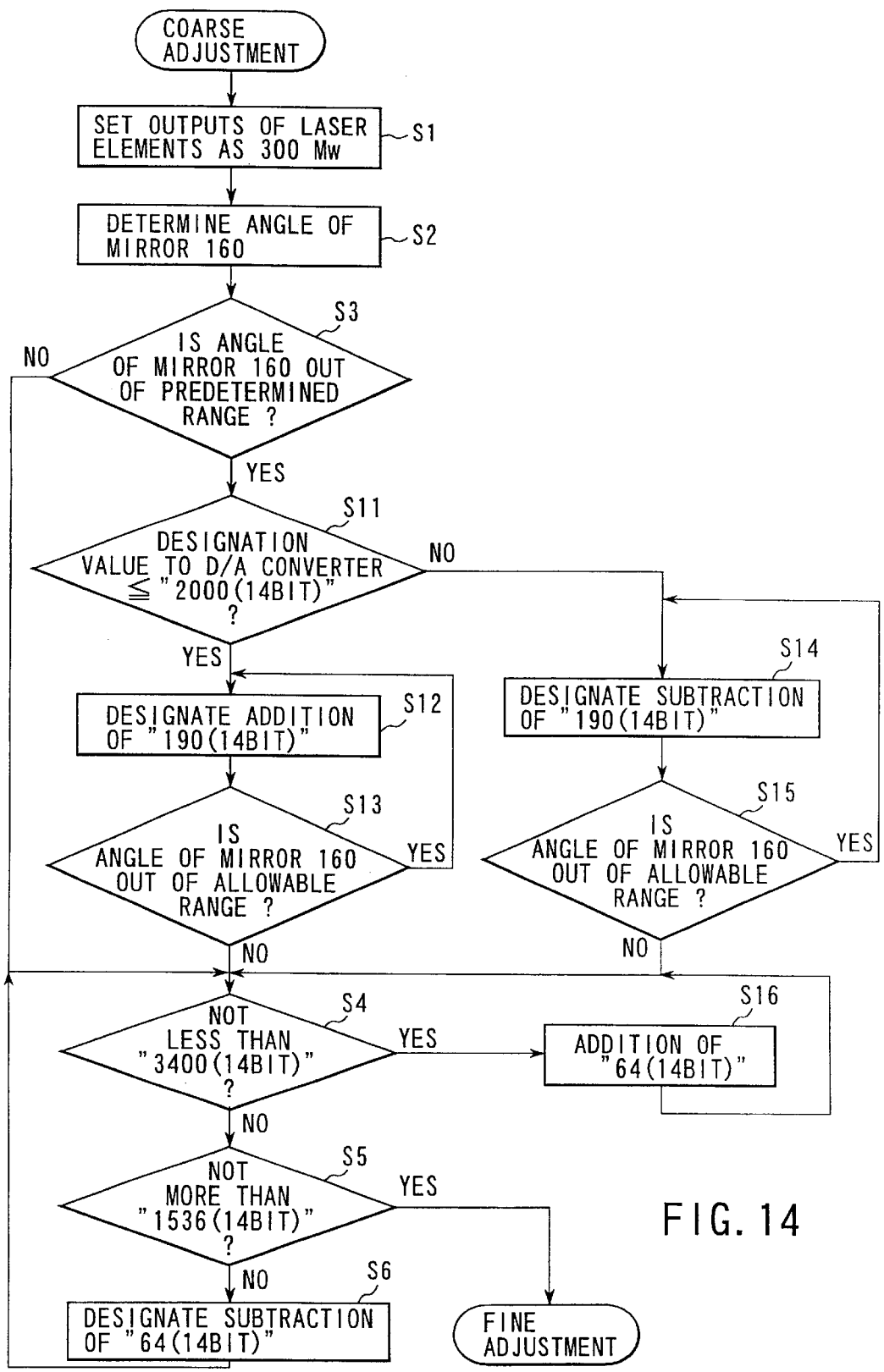
FIG. 14 is a flowchart showing the steps that are followed when the angle of the galvano-mirror is adjusted by use of the beam position sensor having such detection areas as are shown in FIG. 13.

Referring to FIG. 14, the coarse adjustment will be started, and the outputs of the laser elements 41a, 41b, 41c and 41d are set as 300 mW (Step S1).

Either "1FFF(14 bit)" (which indicates the "no current supply" state) or the same value as used last time, is supplied to coil 163b of the mirror driving mechanism 163. The value supplied is a designation value determined for the D/A converter 72, and the angle of the mirror 160 is determined in accordance with that designation value (Step S2).

Subsequently, the output of the beam position sensor 51 is monitored, and a check is made to see whether or not the angle of the mirror 160 is output of the predetermined range (Step S3). If the output of the sensor 51 indicates that the mirror 160 is within the predetermined range (S3-N), the fine adjustment is continued on condition that the designation value supplied from the CPU 60 to the D/A converter 72 is not less than "3400(14 bit)" or not more than "1536(14 bit)" (this condition is confirmed by steps S4 and S5). If the designation value is not less than "3400(14 bit)" or not more than "1536(14 bit)", this indicates that the laser beam is within the 100 μm range including the insensitive area 51-d between the first and second detection areas 51-a and 51-b.

If the output of the sensor 51 is beyond the predetermined range (S3-Y), the angle of the mirror 160 of the galvano-mirror 46 is monitored on the basis of the value of the current supplied to the driving coil 163 (i.e., the designation value determined for the D/A converter 72), and the direction in which the mirror 170 is tilted is determined. In other words, a check is made to see whether or not the voltage designation value supplied from the D/A converter 72 to the coil 163b of the mirror driving circuit 163 under the control of the CPU 60 is smaller than "2000(14 bit)" (Step S11).

If the designation value is smaller than "2000(14 bit)" (S11-Y), the CPU 60 designates addition of "190(14 bit)" to the designation value (Step S12). In a manner similar to that described above with reference to Step S3, the sensor output corresponding to a change in the angle of the mirror 160 is referred to, so as to determine whether the angle of the mirror 160 is within the predetermined range (Step S13). In step S13 indicates that the output of the sensor 51 is not within the predetermined range (S13-Y), the CPU 60 designates addition of "190(14 bit)" to the designation value once again, and the angle of the mirror 160 is monitored. On the other hand, if the output of the sensor 51 is within the predetermined interval (S13-N), the fine adjustment is started on condition that the designation value supplied to the D/A converter 72 is not less than "3400(14 bit)" or not more than "1536(14 bit)."

If step S11 shows that the designation value supplied to the D/A converter 72 is not less than "2000(14 bit)" (S11-N), the subtraction of "190(14 bit)" is designated by the CPU 60 (Step S14). The sensor output corresponding to a change in the angle of the mirror 160 is referred to, so as to determine the angle of the mirror 160 (Step S15). If the output of the sensor 51 shows that the angle of the mirror 160 is out of the predetermined range (S15-Y), the CPU 60 causes the D/A converter 72 to subtract "190(14 bit)" from the designation value, and the angle of the mirror 160 is checked once again. If the output of the sensor 51 shows that the angle of the mirror is within the predetermined range (S15-N), the fine adjustment is continued on condition that the designation value supplied to the D/A converter 72 is not less than "3400(14 bit)" or not more than "1536(14 bit)" (this condition is confirmed by steps S4 and S5). If steps S14 and S15 are repeated more than a predetermined number of times (e.g., 20 times), it is determined that the angle of the mirror 160 is not monitored for some reason or other (e.g., a malfunction of the sensor 51, or abnormal emission of laser elements). In this case, a warning message is indicated on the display area of a control panel 81, thereby urging the user to call a serviceperson for inspection.

Even if step S3 shows that the output of the sensor 51 is within the predetermined range, there may be a case where the designation value to the D/A converter 72 is not less than "3400(14 bit)" (S4-Y). In this case, the CPU 64 designates addition of "64(14 bit)" to the value supplied to the D/A converter 72 (Step S16), and the angle (designated value) of the mirror 160 is checked once again (Step S4). Likewise, there may be a case where the designation value is not more than "1536(14 bit)" even if step S3 shows that the output of the sensor 51 is within the predetermined range (S5-Y). In this case, the CPU 60 designates subtraction of "64(14 bit)" from the designation value supplied to the D/A converter 72, and the angle (designated value) of the mirror 160 is checked once again (Step S5).

Figure 16:
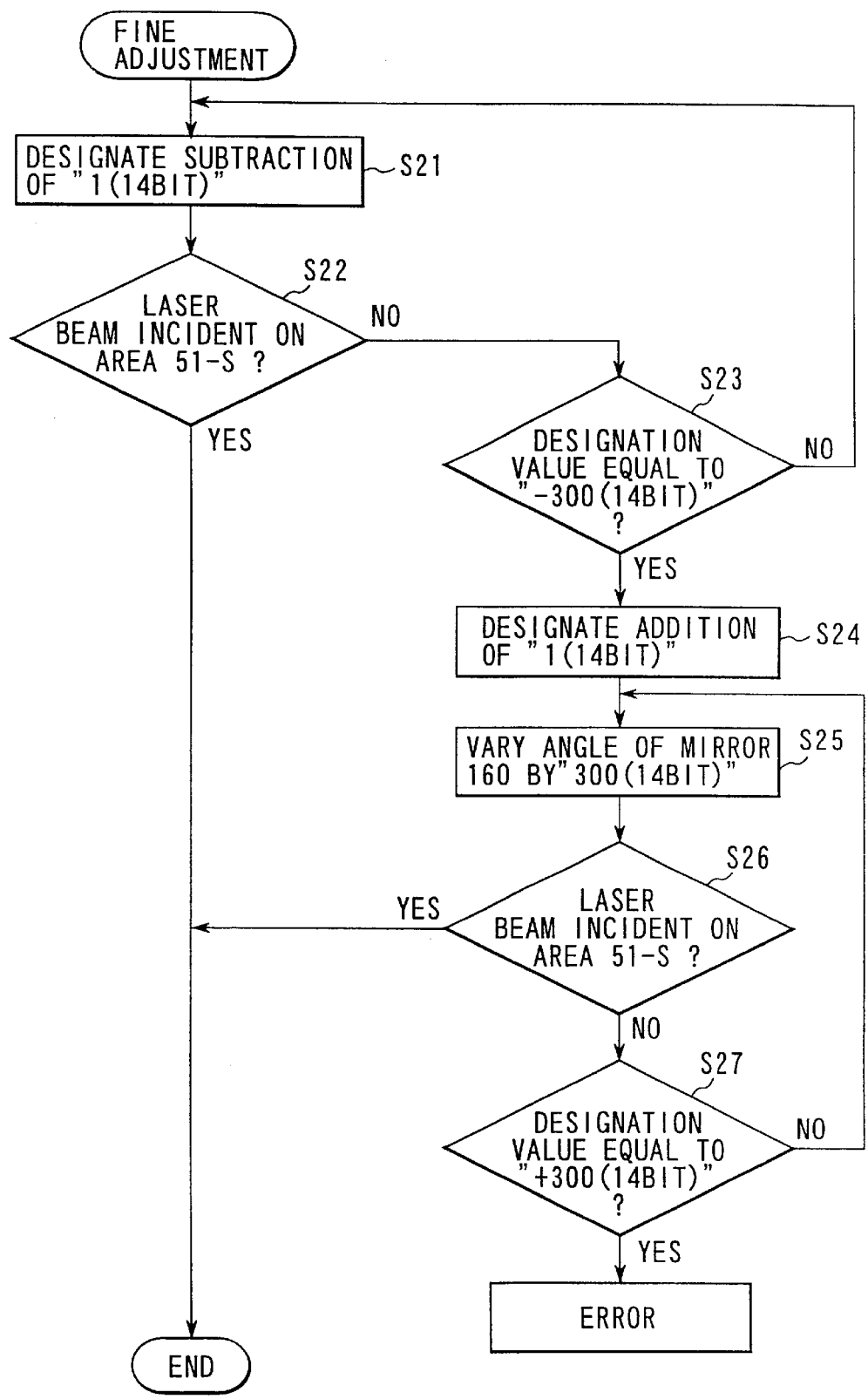
FIG. 16 is a flowchart showing the fine adjustment that is made after the coarse adjustment shown in FIG. 14, the flowchart in FIG. 16 being an example of a method for controlling the mirror driving coil, which controls the position to which the laser beam shown in FIG. 8 to 10 is guided.

FIG. 16 is a flowchart showing the fine adjustment that is made after the coarse adjustment shown in FIG. 14.

Referring to FIG. 16, at the end of the coarse adjustment shown in FIG. 14, CPU 60 newly determines designation values by subtracting "1(14 bit)" from the designation values determined in steps S3, S4 and S5, and supplies the newly-determined designation values to the D/A converter 72 (Step S21). As a result, the position to which the laser beam is guided moves upward (in the "+" direction) by 0.76 μm.

Subsequently, the outputs from the fine-adjustment sensor (detection area) 51-c are checked to see if the angle of the mirror 160 corresponds to a value that is within the range between "−300(14 bit)" and "+300(14 bit)" of the designation value supplied to the D/A converter 72. By this check, it is determined whether or not the laser beam reflected by the mirror 160 is on detection area 51-s which is in the center of the fine-adjustment sensor 51-c (Step S22). If the output is within the predetermined distance, the angle adjustment of the galvano-mirror 160 is ended (S22-Y).

If step S22 shows that the designation value supplied to the D/A converter 72 is out of the range determined between "−300(14 bit)" and "+300(bits)" (S22-N), "1(14 bit)" is subtracted from the designation value, so as to tilt the mirror 160 upward in units of 0.76 μm. This operation is repeated until the designation value becomes equal to "−300(14 bit)" (Step S23).

If step S23 shows that the output of the sensor 51 does not fall within the predetermined range even after the mirror 160 is tilted upward 300 times (i.e., after "1[14 bit]" is subtracted from the designation value 300 times), the CPU 60 uses "300(14 bit)" as the designation value supplied to the D/A converter 72 (Step S24) and gradually varies this designation value. To be more specific, "1(14 bit)" is added to the designation value, so as to tilt the mirror 160 downward in units of 0.76 μm (Step S25). Then, the outputs from the fine-adjustment sensor (detection area) 51-c are checked to see if the designation value supplied to the D/A converter 72 is within the range between "−300(14 bit)" and "+300(14 bit)" (Step S26).

If step S26 shows that the output of the sensor 51-c is out of the predetermined area (S26-N), "1(14 bit)" is added to the designation value, so as to tilt the mirror 160 downward in units of 0.76 μm (Step S25). This operation is repeated until the designation value becomes equal to "+300(14 bit)" (Step S27).

The beam position control shown in FIGS. 14 and 16 (i.e., the adjustment of the angle of the mirror 160 of the galvano-mirror) is executed at arbitrary times, such as the time when the image forming apparatus is switched on, the time when print data is input to the image forming apparatus from an external device (not shown), or the time between the image formation on a copying sheet and the image formation on another copying sheet (i.e., the time corresponding to the delimiting section between two different images). The angle of the mirror 160 is adjusted at predetermined times by operating a mode setting key (not shown) on the control panel 81.

The relationships between the confinement control shown in FIGS. 11A and 11B and the adverse effects of a drift shown in FIGS. 8 to 10 will be described.

As described above with reference to FIGS. 11A and 11B, the designation value for the D/A converter 72, which supplies a current of a given 14 bit value and a given polarity to the coil 163b and thereby controls the angle of the mirror 160, is varied based on eight different patterns which are determined as combinations between the drift direction and the designation values of D/A converters. The eight patterns are specifically α, β, γ, δ, ε, ζ, η and θ determined in accordance with the position of the laser beam reflected by the mirror 160 and detected by the first and second detection areas 51-a and 51-b of the beam position sensor 51. Of the designation patterns shown in FIGS. 11A and 11B, patterns α, δ, ε and θ are correspond to the case where the angle of the mirror 160 cannot be easily converged due to the adverse effects of the drift shown in FIG. 8.

According to pattern a, a laser beam is first confined to the region between "1.5 µm" and "3 µm". Simultaneous with this confinement, "1(14 bit)", which is a minimal control step, is added to the designation value, so as to tilt the mirror 160 downward in units of 0.76 µm (Step S25). After the laser beam is confined to the region between the first and second detection areas 51-a and 51-b, an output from the sensor 51 is read five times, so as to confirm that the angle of the mirror 160 has been converged.

Likewise, according to patterns δ and θ, a laser beam is first confined to the region between "1.5 µm" and "3 µm". Simultaneous with this confinement, "1(14 bit)" is subtracted from the designation value, so as to tilt the mirror 160 upward in units of 0.76 µm. By this control, the angle of the mirror 160 can be converged. According to pattern ε, the angle of the mirror 160 can be converged in a similar manner to that of pattern α.

In the above description, reference was made to the case where the designation value supplied to the D/A converter 72 is varied in units of "1(14 bit)" so as to tilt the mirror 160 by 0.76 µm in each control step. It should be noted that the drift amount is dependent on the performance of the galvano-mirror. Accordingly, a large designation value must be determined for a galvano-mirror whose drift amount is large, while a small designation value must be determined for a galvano-mirror whose drift amount is small.

The sequential control shown in FIGS. 11A and 11B may be combined or replaced with control executed during the warming-up operation of the image forming apparatus. To be more specific, during the warming-up operation, the coil 163b of the mirror 160 of the galvano-mirror 46 is applied with 5V, for example, thereby causing a certain amount of current to flow through the coil 136b. A drift amount is calculated by detecting the extent to which the position of the laser beam is shifted per unit time (e.g., 50 msec). Based on the calculated drift amount, a correction amount is determined, and beam position control is performed in accordance with the correction amount.

Figure 17:
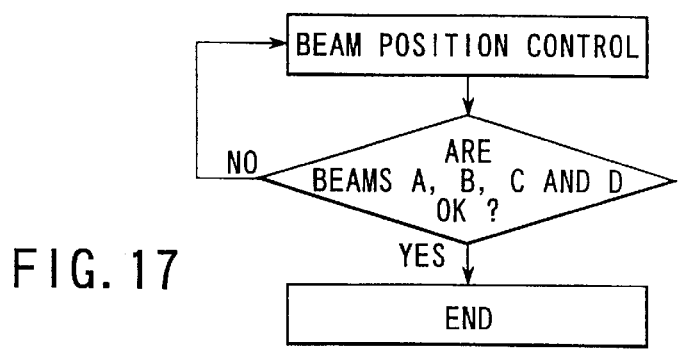
FIG. 17 is a flowchart showing another example of a method for controlling the galvano-mirror shown in FIGS. 14 and 16.

When the control shown in FIGS. 11A and 11B is performed, the angles of the mirrors 160 corresponding to the four laser beams La, Lb, Lc and Ld may be sequentially adjusted in a time sharing manner, as in the order of La→Lb→Lc→Ld→La→Lb . . . . Alternatively, the angles of the mirrors may be determined in accordance with the respective laser beams, and fixed values corresponding to the determined angles are supplied to the D/A converter 72. As described above, however, a subsequent drift is inevitable in either case. The adverse effects caused by that drift may be suppressed by adopting the control shown in FIG. 17. That is, there is a certain period of time between the time when the angle of the first one of the mirrors 160 is determined and the time when the angle of the last one of the mirrors 160 is determined. During this period of time, the above-mentioned control based on the minimum control step is repeated with respect to the mirrors 170 whose angles are already determined. By so doing, the adverse effects caused by the drift can be suppressed.

FIG. 12 is a graph showing the relationships between the extent of drift and the current supply time. In regard to the relationships, an example of control which the image forming apparatus 1 can use to suppress the adverse effects of drift will be described.

If "3FFF(14 bit)" is determined as the setting value for the D/A converter 72, a voltage of 5V is applied to the coil 163b, and the drift amount is measured at the intervals of 50 msec, then the drift amount corresponding to the first 50 msec period starting from the start of the current supply is about 38 µm, the drift amount corresponding to the next 50 msec period is about 18 µm, and the drift amount corresponding to the subsequent 50 msec period is about 4 µm, as shown in FIG. 12. Let us assume that the drift does not have adverse effects on the formation of images if the drift amount is not greater than 10 µm. When a galvano-mirror having such characteristics as shown in FIG. 12 is employed on the basis of that assumption, the image formation should not be executed (i.e., the laser beams are not adjusted in position) during the approximately 150 msec interval from the start of the current supply to the coil. As long as the image formation is not executed, it is possible to eliminate the conditions under which the angle of the mirror 160 of the galvano-mirror 46 varies. Accordingly, the time needed before the convergence of the angle of the mirror 160 (i.e., the confinement of the laser beam). The relationships between the extent of drift and the current supply time, such as those shown in FIG. 12, may differ, depending upon the performance differences among galvano-mirrors. Despite this, however, the reproducibility is very high if the relationships are looked at with respect to one galvano-mirror. Therefore, if the drift amounts measured during the respective 50 msec intervals from the start of the current supply are stored in an NVM (nonvolatile memory) 62, variations in the angle of the mirror 160 can be predicted from the start of the current supply, and the angle of the mirror 160 can be controlled in accordance with the predicted angle variations. If this is done, the time needed for the confinement of the laser beam position can be as short as possible.

As described above, the adverse effects caused by the drift are entirely different between the case where the image forming apparatus in the "cold" state is turned on (for example, when it is turned on in the morning after not being used all night) and the case where the image forming apparatus in the "warm" state is turned on (for example, when it is turned on after being kept off for only a short period of time), and the lengths of time needed to determine the laser beam positions are also entirely different between the two cases. As can be seen from FIG. 12, the difference in the required time is attributable to the length of time during which the coil 163b is kept supplied with a current. That is, if the coil 163b is kept supplied with a current (or the coil 163b is kept applied with a voltage) even after the end of the image formation, the variations in the angle of the mirror can be suppressed. When this is executed, it is preferable that the duty ratio of the wave of the voltage applied to the coil 163b by the D/A converter 72 is set to be about 50%, the drift can be suppressed while simultaneously reducing the power consumption and the heat generation.

In the case where the beam position sensor having the detection areas shown in FIG. 13 is used for detecting the position to which the laser beam from each laser element is guided, there is one thing that must be taken into consideration. When the rotating speed of the polygonal mirror 43a of the defecting device 43 has not yet attained the predetermined speed, the laser beam position may not be detected accurately. In other words, the detection includes an error. This is attributable to the fact that the output signal produced from the beam position sensor is an integral value obtained by integrating the power of the laser beam and the time required for the laser beam to pass through the sensor. In many conventional image forming apparatuses, therefore, the position of a laser beam cannot be detected until the polygonal mirror 43a of the deflecting device 43 comes to rotate in a steady state.

Figure 18:
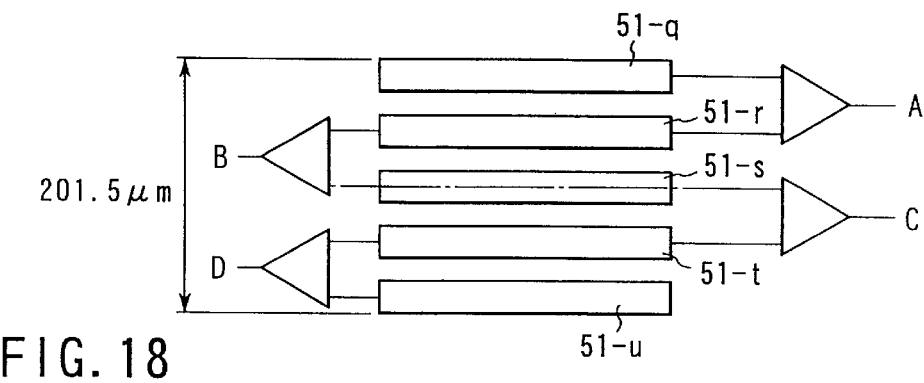
FIG. 18 is a schematic illustration showing an example of a manner in which signals output from a band-shaped detection area of the beam position sensor shown in FIG. 13 are processed.

To solve this problem, the present invention calculates differential signals on the basis of the outputs from the band-shaped areas 51-$q$, 51-$r$, 51-$s$, 51-$t$ and 51-$u$. To be specific, as shown in FIG. 18, the outputs from the adjacent detection areas are processed as follows:

$$|(51\text{-}q)\text{-}(51\text{-}r)|=A$$

$$|(51\text{-}r)\text{-}(51\text{-}s)|=B$$

$$|(51\text{-}s)\text{-}(51\text{-}t)|=C,$$

and $$|(51\text{-}t)\text{-}(51\text{-}u)|=D$$

Figure 19:
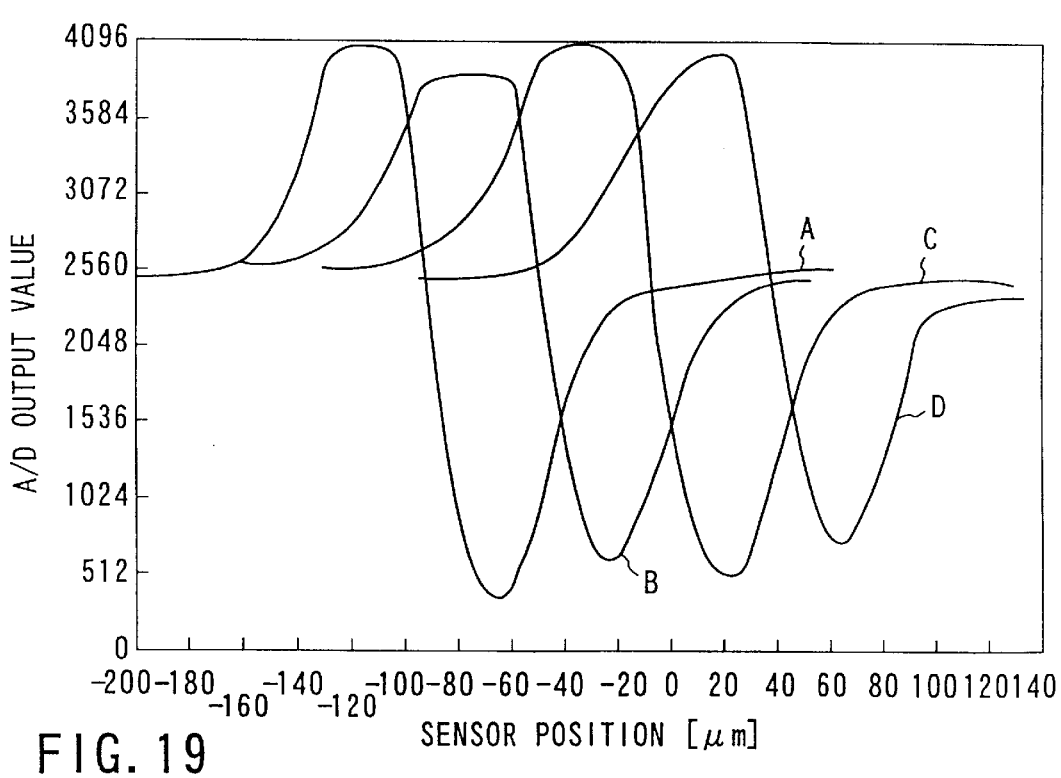
FIG. 19 is a graph showing an example of a sensor output that is produced from the signal processing system shown in FIG. 18.

Assuming that the laser beams move from the upper region to the lower region, as viewed in FIG. 18, (i.e., from area 51-$q$ to area 51-$u$), a description will be given as to how the position of laser beam La that falls on sensor 51 first is related to the outputs from the first and second detection areas 51-$q$ and 51-$r$ (i.e., the output from differential amplifier A). As shown in FIG. 19, when the laser beam La is not incident on area 51-$q$ or area 51-$r$ (this state corresponds to the area close to −180 μm on the axis of abscissa), the output from the A/D converter (which converts the outputs from those areas into digital signals) is "2560(14 bit)", which corresponds to 0V. When the laser beam La is about to enter the first area 51-$q$ (this state corresponds to the area close to −140 μm on the axis of abscissa), the output from the A/D converter begins to increase. When the laser beam La has moved to the enter of the first area 51-$q$ (this state corresponds to the area close to −120 μm on the axis of abscissa), the output becomes maximal. When the laser beam La is between the first and second areas 51-$q$ and 51-$r$ (this state corresponds to the area close to −90 μm on the axis of abscissa), the output in question begins to decrease. When the laser beam La comes to the center of the second detection area 51-$r$ (this state corresponds to the area close to −70 μm on the axis of abscissa), the output becomes minimal. When the laser beam La is completely away from the first and second detection areas 51-$q$ and 51-$r$ (this state corresponds to the area close to −20 μm on the axis of abscissa), the output becomes approximately zero. Similar outputs are produced in substantially the same cycle when the laser beams Lb, Lc and Ld move from area 51-$q$ to area 51-$u$.

As can be seen from the above, the coarse adjustment illustrated in FIG. 14 can be applied to the third detection area 51-$c$, which is a detection area for fine adjustment.

Figure 15:
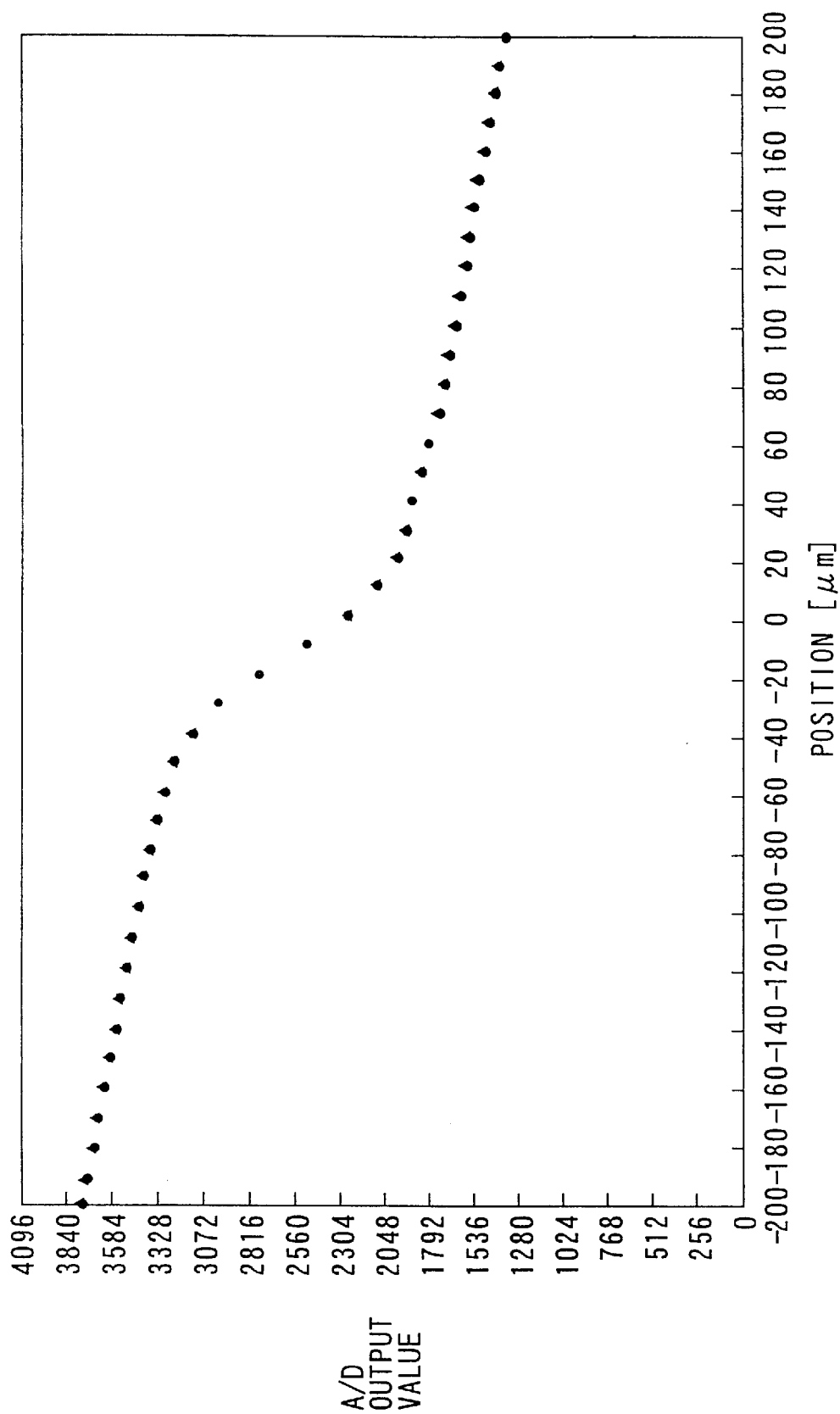
FIG. 15 is a graph indicating numeral data that are used in the galvano-mirror angle-adjusting step shown in FIG. 14, the numeral data being used for translating an output from each sensor into a laser beam-guided position.

That is to say, when coarse adjustment is made with respect to the galvano-mirror 46 used for guiding the laser beams La to Ld, the outputs of differential amplifiers A to D are sequentially monitored, so as to identify the differential amplifier that is detecting the peak value of the corresponding laser beam. The position of the laser beam can be calculated in a method opposite to that described above with reference to FIG. 15.

More specifically, an A/D converter (not shown) is used to convert outputs A, B, C and D, which are produced from detection areas irradiated with laser beams, into digital signals. On the basis of the graph shown in FIG. 19, the digital signals are processed with thresholds of "3584(14 bit)" and "1536(14 bit)". As a result, a laser beam is detected as having been incident on the region (width: 201.5 μm) where the band-shaped detection areas 51-$q$, 51-$r$, 51-$s$, 51-$t$ and 51-$u$ are provided.

In the graph shown in FIG. 19, the outputs A to D of the differential amplifiers described with reference to FIG. 18 are converted into a 14-bit digital signal by the A/D converter. If the digital signal is neither not less than "3584(14 bit)" nor not more than "1536(14 bit)", this indicates the fact that the laser beam reflected by the mirror 160 reaches one of the five band-shaped detection areas 51-$q$, 51-$r$, 51-$s$ and 51-4 or the region between two adjacent detection areas. As this method provides a detection area (detection width: 201.5 μm) that is as reliable as the first and second detection areas shown in FIG. 13.

Accordingly, the beam position sensor 51 and the beam position sensing circuit 74 can be as simple as possible.

In the case where the parallel band-shaped detection areas shown in FIG. 18 (and FIG. 19) are used, the detection of the positions of laser beams is not adversely affected by the rotating speed of the polygonal mirror 43$a$ of the detecting device 43. (In the first and second detection areas, the confinement section 51-1 gradually changes in size and moves to the to the insensitive area 51-$d$. Therefore, the rotating speed of the polygonal mirror 43$a$ of the deflecting device 43 becomes a factor that may adversely affect the detection of the positions of laser beams.) Accordingly, the positions irradiated with the laser beams can be identified without reference to the rotating speed of the polygonal mirror 43$a$ of the deflecting device 43 (i.e., the positions can be identified before the rotating speed becomes a predetermined speed). This is advantageous in practice since high-intensity laser beams can be guided to the detection areas 51-$q$, 51-$r$, 51-$s$, 51-$t$ and 51-$u$ when the polygonal mirror 43$a$ of the deflecting device 43 is still low.

Accordingly, it is possible to make good use of the warming-up period, which starts from the time when the image forming apparatus 1 is turned on and ends at the time when the rotating speed of the polygonal mirror 43$a$ of the deflecting device 43 of the exposure apparatus 21 becomes a predetermined value. As a result, the standby time required before the start of printing can be as short as possible.

The acceleration characteristic of the mirror motor 43$b$, with which the polygonal mirror 43$a$ of the deflecting device 43 is rotated, is, for example, five seconds when the rotating speed increases from 0 [rpm] to 20,000 [rpm], and two seconds when it increases from 15,000 [rpm] to 20,000 [rpm].

Let us assume that the mirror of each of the galvano-mirrors 46 is tilted at such an angle as enables a laser beam to be guided to one of the band-shaped areas of the third detection area 51-$c$. If, in this case, the time required for one differential amplifier to process the outputs of the corresponding detection areas is 10 msec, the total tome required for processing the outputs is 40 msec. Since the number of laser beams is four, the shortest time required for determining the angles at which the mirrors 160 of the galvano-mirrors 46 should be tilted to enable the laser beams to be detectable by the sensor 51, is 160 msec (=40×4). Let us assume that, as shown in FIG. 6, the moving distance of a laser beam is ½ of 11.5 m and the amount by which the laser beam is confined in one control step is ½ of 200 μm. In this case, the maximal time required for determining the target angles of the mirrors 160 can be estimated as follows:

11.5×(1/0.1)×10 msec×4=18,400 msec (18.4 seconds)

If all laser beams are shifted from the right positions for a distance of 200 μm due to the drift occurring in the galvano-mirrors 46, then the time required for guiding the laser beams to their right positions is:

0.2×(1/0.1)×10 msec×4=320 msec

The overall control time is lengthened, accordingly.

In the case where the beam sensor position having the band-shaped detection areas shown in FIG. 18 and the four amplifiers A to D are employed, the angles of the mirrors 170 can be controlled when the mirror motor 43$b$ is still accelerating. As long as the positions irradiated with the laser beams are shifted due to the drift or the angles of the mirrors can be determined within the shortest possible time, the laser beams can be guided to the intended positions within the period of time required for the rotating speed of the mirror motor 43$b$ to become stable. (The angles of the mirrors 160 can be controlled to be within the predetermined ranges in the period of time.)

As described above, the exposure apparatus of the present invention emits a plurality of laser beams for exposure and accurately controls the tilting angles of mirrors without being adversely affected by a drift, thereby accurately controlling the distance between scanning lines in both the main scanning direction and the sub-scanning direction.

In addition, the mirror angles can be controlled within the period of time in which the mirror motor of the deflecting device (which deflects the laser beams at a predetermined angle) is still accelerating.

Accordingly, even if image formation is executed immediately after the image forming apparatus is turned on, or if the angles of the mirrors are shifted in different ways due to the performance difference among the mirror devices, the images formed by the image forming apparatus are not distorted, or the lines constituting part of the images are reproduced without being shifted. Moreover, the time required from the actuation of the image forming apparatus to the end of an image forming operation is short.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exposure apparatus comprising:
    a plurality of light sources for emitting light beams, respectively;
    light path alignment mirrors for synthesizing the light beams from the light sources together, such that the light beams are spaced apart from one another by predetermined distances in a first direction;
    a deflection device for deflecting the light beams, emitted from the light sources and synthesized by the light path alignment mirrors, in a second direction perpendicular to the first direction;
    a drift detection sensor for sensing at least one of the light beams emitted from the light sources and deflected by the deflection device, and for detecting how a given light path alignment mirror is drifted in the first direction; and
    light path alignment mirror-driving units for correcting a drift of each of the light path alignment mirrors in accordance with a drift detected by the drift detection sensor.

2. An exposure apparatus according to claim 1, wherein each of said light path alignment mirrors is movable in the first direction and includes a mirror for reflecting the light beams emitted from the light sources, and an angle at which the mirror reflects the light beams emitted from the light sources is determined by varying an angle of a reflection surface of the mirror by each of the light path alignment mirror-driving units.

3. An exposure apparatus according to claim 2, wherein each of said light path alignment mirror-driving units includes an electromagnetic driving circuit for driving the mirror in the first direction such that the mirror is tilted at an arbitrary angle, and each of said light path alignment mirror-driving units keeps the electromagnetic driving circuit in an active state.

4. An exposure apparatus according to claim 3, wherein each of said light path alignment mirror-driving units provide the corresponding optical path alignment mirror with an effective output which is low in a non-image formation mode and which is high in an image formation mode.

5. An exposure apparatus according to claim 3, wherein each of said light path alignment mirror-driving units keep the electromagnetic driving circuit in an active state within a predetermined period of time from a start of current supply, and each of the light path alignment mirrors is kept drifted in the first direction after the drift is detected by the drift detection sensor.

6. An exposure apparatus according to claim 3, wherein each of said light path alignment mirror-driving units stores data representing a drift amount and a drift direction which the drift detection sensor detects with respect to the drift detection sensor, predicts a length of time and a direction in which the light path alignment mirror should be driven, in accordance with the drift amount detected by the drift detection sensor, and actuates the electromagnetic driving circuit.

7. An exposure apparatus according to claim 3, wherein each of said light path alignment mirror-driving units checks a drift amount and a drift direction which the drift detection sensor detects with respect to the drift detection sensor, and drives the light path alignment mirror in a direction opposite to the drift direction for a predetermined length of time.

8. An exposure apparatus according to claim 3, wherein each of said light path alignment mirror-driving units drive the light path alignment mirror to correct a drift in the first direction in a period of time in which the deflection device warms up and becomes ready for predetermined operation.

9. An exposure apparatus according to claim 3, wherein each of said light path alignment mirror-driving units keeps the electromagnetic driving circuit in an actuated state until first and second light beams are detected as falling on a region that is within a predetermined range of the deflection device.

10. An exposure apparatus according to claim 1, wherein said drift detection sensor detects a timing for determining an image signal output time with respect to each of light beams deflected in the first direction by the deflection device.

11. An exposure apparatus according to claim 1, wherein said drift detection sensor includes a plurality of light detection elements arranged in parallel to one another and used for detecting the light beams deflected in the first direction by the deflection device, and said drift detection sensor senses an arbitrary light beam when the arbitrary light beam reaches a region between the light detection elements and supplies information on the arbitrary state to each of the light path alignment mirror-driving units.

12. An exposure apparatus according to claim 1, wherein said drift detection sensor includes a light detection element having a light detection area whose size varies in the first direction, and senses an arbitrary light beam when the arbitrary light beam passes a particular position predetermined on the light detection element in the first direction.

13. An exposure apparatus according to claim 12, wherein said light detection element includes at least two detection areas which are spaced from each other in the first direction, with a predetermined gap maintained, and a length of the detection areas, as viewed in the first direction, increases in directions away from the gap.

14. An exposure apparatus comprising:
- a plurality of light sources for emitting light beams, respectively;
- light path alignment mirrors for synthesizing the light beams from the light sources together, such that the light beams are spaced apart from one another by predetermined distances in a first direction;
- a deflection device for deflecting the light beams, emitted from the light sources and synthesized by the light path alignment mirrors, in a second direction perpendicular to the first direction;
- a drift detection sensor for sensing at least one of the light beams emitted from the light sources and deflected by the deflection device, and for detecting how each of the light path alignment mirrors is drifted in the first direction; and
- light path alignment mirror-driving units for correcting a drift of each of the light path alignment mirrors in accordance with a drift detected by the drift detection sensor, each of said light path alignment mirror-driving units driving the light path alignment mirrors to correct a drift in the first direction in a period of time in which the deflection device warms up and becomes ready for a predetermined operation.

15. A mirror adjusting method for use in an exposure apparatus comprising:
- a plurality of movable mirrors which are equal in number to light sources and which are electro-magnetically driven so that reflection surfaces thereof are tilted at such angles as to enable light beams from the light sources to be spaced by predetermined distances in a first direction;
- a deflection device for deflecting the light beams, emitted from the light sources and synthesized by the movable mirrors, in a second direction;
- a drift sensor, having at least two detection areas spaced by a predetermined distance in the first direction, for sensing the light beams emitted from the light sources and deflected by the deflection device, and for detecting how the movable mirrors are drifted in the first direction; and
- a plurality of movable mirror drivers for correcting drifts of the movable mirrors in accordance with drifts detected by the drift detection sensor, such that the light beams emitted from the light sources can be regarded as one light beam, said method being for adjusting the angles of the movable mirrors in the first direction in accordance with the light beams emitted from the light sources and being incident on the drift sensor, said method comprising the steps of:

- supplying a predetermined driving current to each of the movable mirror drivers so as to set the angles of the movable mirror in a first state;
- detecting a light position with the drift sensor;
- checking whether or not a sensor output is produced, supplying a second driving current to each of the movable mirror drivers such that predetermined detection areas of the drift sensor are drifted, if the sensor output is not detected, and detecting the light position once again;
- checking whether or not the sensor output is produced, supplying a third driving current to each of the movable mirror drivers such that the angles of the mirrors are adjusted and the sensor output is within a predetermined range, if the sensor output is detected, said third driving current having a smaller current value than the second driving current; and
- supplying a fourth driving current to each of the movable mirror drivers if adjacent detection areas of the drift sensor sense a light beam reflected by the movable mirrors whose angles have been adjusted, said fourth driving current being equivalent in direction to the third driving current and corresponding in amount to one control step of the third driving circuit.

16. A method according to claim 15, wherein:
when the third driving current is supplied to each of the moveable mirror drivers, a beam moving direction is predicted on the basis of a beam position which the drift sensor senses at a last time and a beam position which the drift sensor senses at a time immediately before the last time, and a polarity of the third driving current is determined in accordance with the predicted beam moving direction.

17. A method according to claim 15, wherein:
when the third driving current is supplied to each of the moveable mirror driving circuits, a beam moving direction is predicted on the basis of a beam position which the drift sensor senses all at a last time and a beam position which the drift sensor senses at a time immediately before the last time, and
if the beam moving direction is a direction in which the light beams move away from the detection areas spaced in the first direction, the third driving current is switched in polarity to a driving current supplied last.

18. A method according to claim 15, wherein:
when the third driving current is supplied to each of the moveable mirror drivers, a beam moving direction is predicted on the basis of a beam position which the drift sensor senses at a last time and a beam position which the drift sensor senses at a time immediately before the last time, and
if the beam positions are close to a gap between the detection areas spaced in the first direction, the third driving current is switched in polarity to a driving current supplied last.

* * * * *